United States Patent
Marechal et al.

(10) Patent No.: US 8,344,063 B2
(45) Date of Patent: Jan. 1, 2013

(54) MONOMODAL COUPLED DIENE ELASTOMER HAVING A SILANOL FUNCTIONAL GROUP IN THE MIDDLE OF THE CHAIN, ITS PROCESS OF PREPARATION AND RUBBER COMPOSITION COMPRISING IT

(75) Inventors: Jean-Marc Marechal, Chamalieres (FR); Philippe Chaboche, Clermont-Ferrand (FR); Jean-Michel Favrot, Cournon d'Auvergne (FR)

(73) Assignees: Michelin Recherche Et Technique S.A., Granges-Paccot (CH); Compahnie Generale des Establissements Michelin, Clermont-Ferrand (FR)

( * ) Notice: Subject to any disclaimer, the term of this patent is extended or adjusted under 35 U.S.C. 154(b) by 523 days.

(21) Appl. No.: 12/596,582
(22) PCT Filed: Apr. 15, 2008
(86) PCT No.: PCT/EP2008/002977
§ 371 (c)(1),
(2), (4) Date: Mar. 30, 2010
(87) PCT Pub. No.: WO2008/141702
PCT Pub. Date: Nov. 27, 2008

(65) Prior Publication Data
US 2010/0184912 A1  Jul. 22, 2010

(30) Foreign Application Priority Data
Apr. 18, 2007 (FR) .................. 07 02818

(51) Int. Cl.
B60C 1/00 (2006.01)
C08F 2/00 (2006.01)
C08F 283/00 (2006.01)
C08F 283/12 (2006.01)

(52) U.S. Cl. ......... 524/571; 526/194; 525/389; 525/474
(58) Field of Classification Search ............ 524/571; 526/194; 525/389, 474
See application file for complete search history.

(56) References Cited

U.S. PATENT DOCUMENTS
5,554,696 A  9/1996  Fayt et al.

FOREIGN PATENT DOCUMENTS
EP  1 400 560 B1 *  3/2004
FR  2 242 407 A  3/1975

OTHER PUBLICATIONS

Zelinski R P et al., "Synthesis of trichain and tetrachain radial polybutadienes", Journal of Polymer Science Part A, Polymer Chemistry, Wiley, New York, NY, vol. 3, No. 1, Jan. 1965, pp. 93-103.
International Search Report (PCT/ISA/210) dated Jun. 4, 2008.
EPO Form 1503 dated Jan. 11, 2008.

* cited by examiner

*Primary Examiner* — William Cheung
(74) *Attorney, Agent, or Firm* — Buchanan Ingersoll & Rooney PC

(57) ABSTRACT

The present invention relates to a monomodal coupled diene elastomer having a silanol functional group in the middle of the chain, to its process of preparation and to a rubber composition which can be used in particular in the manufacture of tire covers, having improved hysteresis and physical properties in the vulcanized state and an improved processing in the raw state, comprising a monomodal diene polymer having a silanol functional group in the middle of the chain and a reinforcing inorganic filler. The process for obtaining this elastomer having a silanol functional group in the middle of the chain comprises a reaction of the diene monomer(s) and of the polymerization initiator in the presence of a chelating polar agent, a reaction of the living diene polymer with a coupling agent and then, after hydrolysis, a recovery of the coupled diene polymer having a functional group in the middle of the chain. A rubber composition according to the invention comprises a reinforcing inorganic filler and this monomodal elastomer having a silanol functional group in the middle of the chain.

22 Claims, 6 Drawing Sheets

Copolymer A

MONOMODAL COUPLED DIENE ELASTOMER HAVING A SILANOL FUNCTIONAL GROUP IN THE MIDDLE OF THE CHAIN, ITS PROCESS OF PREPARATION AND RUBBER COMPOSITION COMPRISING IT

The present application is a national stage application of PCT/EP08/02977 filed Apr. 15, 2008, which claims benefit of France Patent Application No. 07-02818 filed Apr. 18, 2007. The entirety of both applications is incorporated hereby reference.

The present invention relates to a monomodal coupled diene elastomer having a silanol functional group in the middle of the chain, to a process for the preparation of this elastomer and to a rubber composition which can be used in particular in the manufacture of tyre covers, having improved hysteresis and physical properties in the vulcanized state and an improved processing in the raw state, comprising a monomodal diene polymer having a silanol functional group in the middle of the chain and a reinforcing inorganic filler.

Now that savings in fuel and the need to protect the environment have become a priority, it is desirable to produce polymers having good mechanical properties and a hysteresis which is as low as possible and to be able to employ them in the form of rubber compositions which can be used in the manufacture of various semifinished products involved in the composition of tyre covers, such as, for example, underlayers, bonding rubbers between rubbers of different natures, coating rubbers for metal or textile reinforcing elements, sidewall rubbers or treads, and to obtain tyres with improved properties, in particular having a reduced rolling resistance.

In order to achieve such an objective, numerous solutions have been provided which consist in particular in modifying the nature of the diene polymers and copolymers at the end of polymerization using coupling or starring or functionalizing agents. The very great majority of these solutions have essentially concentrated on the use of modified polymers with carbon black as reinforcing filler with the aim of obtaining a good interaction between the modified polymer and the carbon black, use of a white filler, in particular silica, having proved to be inappropriate due to the low level of certain properties of such compositions and consequently of certain properties of tyres employing these compositions, such as low wear resistance. Mention may be made, as illustrative examples of this prior art, of U.S. Pat. No. 4,677,165, which describes the reaction of functionalized living polymers with benzophenone derivatives in order to obtain improved properties in the compositions comprising carbon black. With the same aim, U.S. Pat. No. 4,647,625 describes elastomer functionalization by reaction of living polymers with N-methylpyrrolidine. Patent Applications EP-A-0 590 491 and EP-A-0 593 049 describe polymers carrying amine functional groups which make possible a better interaction between the polymer and the carbon black.

A few solutions have also been provided relating to the use of silica as reinforcing filler in compositions intended to constitute tyre treads. Thus, Patent Applications EP-A-0 299 074 and EP-A-0 447 066 describe functionalized polymers comprising alkoxysilane functional groups. These functionalized polymers were described in the prior art as effective in reducing hysteresis and improving resistance to abrasion; however, their properties remain inadequate to allow the use of these polymers in compositions intended to constitute tyre treads. Furthermore, the formulation of these polymers presents problems of change in the macrostructures during the removal of the polymerization solvent, which results in a severe deterioration in the potentially advantageous properties. In addition, this change is very difficult to control.

More recently, Patent Application EP-A-0 877 047 described a rubber composition, using carbon black having silica fixed to its surface as reinforcing filler, based on a diene polymer functionalized at the chain end by a silanol functional group or a polysiloxane block having at least one silanol end or a diene polymer functionalized along its chain by silanol functional groups. This composition exhibits improved hysteresis properties in comparison with compositions including carbon black as reinforcing filler. The raw use, that is to say in the nonvulcanized state, of the said composition is problematic due to the high Mooney viscosity of the raw mixture.

Several routes for the synthesis of the elastomers functionalized by a silanol functional group are provided in this document; in particular, a description is given of the synthesis by reaction of a living polymer chain with a cyclic polysiloxane and the reaction of a dihalosilane derivative of $R_1R_2SiX_n$ type with a living polymer chain with $R_1$ and $R_2$, which are identical or different, representing an alkyl group having from 1 to 8 carbon atoms, X representing a halogen atom, preferably chlorine or bromine, and n being the integer 2. This reaction results in the formation of an SBR having an Si—X functional group at the chain end which, after hydrolysis, is converted to an SiOH bond, as described in the handbook "Chemistry and Technology of Silicones", Academic Press, New York, N.Y., 1968, page 95. It is also mentioned in this handbook that this Si—X functional group can change and can result in a condensation reaction. However, it is known from the document of Patent EP 0 778 311 A1 that the conventional operation for recovering by steam stripping the polymerization solvent during the recovery of the functionalized polymer does not allow this Si—X functional group to change.

The paper in the Journal of Polymer Science: Part A, vol. 3, pages 93-103 (1965), describes the reaction of diene elastomers prepared without a polar agent using halosilane derivatives of $R_xSiX_{4-x}$ type with x=0-3. The formation of functional polybutadiene having an Si—Cl functional group in the middle of the chain resulting from the reaction of two living polymer chains with a $CH_3SiCl_3$ molecule is mentioned. For a person skilled in the art, this reaction, followed by hydrolysis, results in the formation of a polybutadiene having an SiOH functional group in the middle of the chain. The content of 1,2-bonds of the functional polybutadiene is only 8%.

Patent Applications EP 1 398 347 A1, EP 1 400 559 A1 and EP 1 400 560 A1 disclose the use of rubber compositions which can be used in the manufacture of tyre covers comprising a polymodal and preferably bimodal composite SBR having at least one SiOH or SiOR functional group in the middle of the chain, sold by Japan Synthetic Rubber Corporation under the brand T596. This polymodal composite SBR comprises from 35 to 55% by weight of a nonfunctional SBR1 with a number-average molecular weight Mn ranging from 200 000 to 300 000 g/mol, from 65 to 35% by weight of an SBR2 having a number-average molecular weight Mn ranging from 400 000 to 500 000 g/mol, a styrene content ranging from 25 to 35% and a content of 1,2-units for the butadiene part ranging from 50 to 70% (a glass transition temperature Tg ranging from −15° C. to −30° C.), and from 0 to 10% by weight of an SBR3 having a number-average molecular weight of greater than 550 000 g/mol.

The elastomers which can be used in a rubber composition which can be crosslinked for the purpose of a tyre use are mainly copolymers of butadiene and styrene (SBR) or polybutadienes (BR). Their synthesis requires the use of a polar agent during the polymerization stage in order to make possible the adjusting of the glass transition temperature. Several types of polar agents can be used, including nonchelating polar agents of THF type and chelating polar agents having at least one nonbonding doublet on at least two atoms, such as, for example, of tetrahydrofurfuryl ethyl ether or tetramethylethylenediamine type.

The present invention relates, as novel industrial product, to a coupled diene elastomer having a silanol functional group in the middle of the chain, an overall level of Si functional group L (which is the ratio $N_s/N_p$, in which $N_s$ represents the number of moles of silicon bonded to the coupled polymer, determined by $^1H$ nuclear magnetic resonance NMR and expressed in mmol/kg, and $N_p$ represents the number of mmoles of polymer before coupling per kilogram of polymer) ranging from 0.36 to 0.60 (i.e., a level of Si functional group ranging from 36% to 60%), a level of silanol functional group (SiOH) in the middle of the chain L1, which is the ratio corresponding to the number of moles of SiOH functional groups to the number of moles of silicon (Si), determined by 2D $^1H$-$^{29}Si$ nuclear magnetic resonance NMR, ranging from 80 to 100% and a monomodal distribution of the number-average molecular weights of the coupled polymer chains.

The number $N_p$ is obtained by the ratio $10^6$ to number-average molecular weight Mn determined by size exclusion chromatography (SEC3D).

The present invention also relates to a process for obtaining a monomodal coupled diene elastomer having a silanol functional group in the middle of the chain which consists, in a first stage, in reacting the monomer(s), in the presence or absence of an inert hydrocarbon solvent, in the presence of a chelating polar agent having at least one nonbonding doublet at least on two atoms, with a polymerization initiator, in order to form a living diene polymer, and in reacting, in a second stage, as known per se, the said living polymer with a coupling agent for polymer chains, in order to obtain, after hydrolysis, the monomodal coupled diene polymer having a silanol functional group in the middle of the chain.

The term monomodal elastomer or polymer means, in connection with the distribution of the molecular weights, a distribution of the number-average molecular weights, determined by the SEC (size exclusion chromatography) technique, corresponding to a single peak during the decomposition of the SEC chromatogram.

Specifically, the Applicant Company has discovered, surprisingly, that the nature of the polar agent employed during the polymerization stage has an influence on the selectivity of the coupling reaction between the living polymer chains and the coupling agent for polymer chains. When a nonchelating polar agent is used, the formation is observed of various entities, including in particular three-branched stars, whereas, when a chelating polar agent is used, it is found, on the one hand, that the level L is high, that is to say ranging from 0.36 to 0.60, which demonstrates that the majority of the polymer chains comprising an Si atom are coupled, it being known that the optimum of the coupling reaction consists in having two polymer chains coupled to one Si atom, which corresponds to a level of Si functional group of 0.5, and, on the other hand, that coupled elastomers having a silanol functional group in the middle of the chain are very predominantly formed (level of functionalization L1>80%, that is to say ranging from 80 to 100%), due to a very high selectivity of the said chelating polar agent, and that the distribution of the number-average molecular weights of the coupled polymer chains is monomodal.

The chelating polar agent is preferably brought together with the diene monomer(s) and solvent, when the polymerization is carried out in solution, before addition of the polymerization initiator.

Suitable chelating polar agents which can be used in the process in accordance with the invention are in particular the agents comprising at least one tertiary amine functional group or at least one ether functional group, and preferably agents of tetrahydrofurfuryl ethyl ether or tetramethylethylenediamine type.

Suitable conjugated dienes which can be used in the process in accordance with the invention are in particular 1,3-butadiene, 2-methyl-1,3-butadiene, 2,3-di($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene, 2,4-hexadiene, and the like.

Suitable vinylaromatic compounds are in particular styrene, ortho-, meta- or para-methylstyrene, the "vinyltoluene" commercial mixture, para-(tert-butyl)styrene, methoxystyrenes, vinylmesitylene, divinylbenzene, vinylnaphthalene, and the like.

The copolymers can comprise between 99% and 20% by weight of diene units and from 1% to 80% by weight of vinylaromatic units.

The monomodal coupled diene polymers carrying a silanol functional group in the middle of the chain can have any microstructure, which depends on the polymerization conditions used. The polymers can be block, random, sequential or microsequential polymers, and the like, and can be prepared in dispersion or in solution. When an anionic polymerization is involved, the microstructure of these polymers can be determined by the presence or absence of a modifying and/or randomizing agent and the amounts of modifying and/or randomizing agent employed.

Monomodal coupled diene polymers capable of being prepared according to the process in accordance with the invention is understood to mean any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms.

Particularly preferably, the monomodal coupled diene polymer carrying a silanol functional group in the middle of the chain is chosen from the group of the "highly unsaturated" diene elastomers prepared in solution composed of polybutadienes (BR), synthetic polyisoprenes (IR), butadiene-styrene copolymers (SBR), butadiene-isoprene copolymers (BIR), isoprene-styrene copolymers (SIR) and butadiene-styrene-isoprene copolymers (SBIR).

More preferably still, the said elastomer belongs to the family composed of polybutadienes, butadiene-styrene copolymers and butadiene-styrene-isoprene copolymers prepared in solution, and polyisoprene.

Advantageously, the said elastomer is a butadiene-styrene copolymer prepared in solution.

Advantageously, the said elastomer is a butadiene-styrene copolymer prepared in solution having a styrene content of between 20% and 45% by weight, a content of vinyl bonds of the butadiene part of between 15% and 65%, a content of trans-1,4-bonds of between 15% and 75% and a Tg of between −5 and −65° C. and preferably between −20 and −55° C.

Preferably suitable are polybutadienes and in particular those having a content of 1,2-units of between 15% and 80%, polyisoprenes, butadiene-styrene copolymers and in particular those having a styrene content of between 4 and 50% by weight and more particularly between 20% and 40% by weight, a content of 1,2-bonds of the butadiene part of between 15% and 65% and a content of trans-1,4-bonds of between 10% and 80%, butadiene-isoprene copolymers and in particular those having an isoprene content of between 5 and 90% by weight and a glass transition temperature (Tg) of −40° C. to −80° C., and isoprene-styrene copolymers and in particular those having a styrene content of between 5 and 50% by weight and a Tg of between −5° C. and −50° C. In the case of butadiene-styrene-isoprene copolymers, those which are suitable have a styrene content of between 5 and 50% by weight and more particularly of between 10% and 40% by weight, an isoprene content of between 15% and 60% by weight and more particularly of between 20% and 50% by weight, a butadiene content of between 5 and 50% by weight and more particular between 20% and 40% by weight, a content of 1,2-units of the butadiene part of between 15% and 85%, a content of trans-1,4-units of the butadiene part of between 6% and 80%, a content of 1,2-units plus 3,4-units of the isoprene part of between 15% and 70% and a content of trans-1,4-units of the isoprene part of between 10% and 50% and are more generally any butadiene-styrene-isoprene copolymer having a Tg of between −5° C. and −70° C.

Use may be made, as polymerization initiator, of any known monofunctional anionic initiator. However, an initiator comprising an alkali metal, such as lithium, is preferably used. Suitable organolithium initiators are in particular those comprising a carbon-lithium bond. Representative compounds are aliphatic organolithium compounds, such as ethyllithium, n-butyllithium (n-BuLi), isobutyllithium, and the like. Lithium amides, which are obtained from a cyclic secondary amine, such as pyrrolidine and hexamethyleneimine, and which are soluble in a hydrocarbon solvent without use of a solvating agent are highly preferred.

The polymerization is, as known per se, preferably carried out in the presence of an inert hydrocarbon solvent which can, for example, be an aliphatic or alicyclic hydrocarbon, such as pentane, hexane, heptane, isooctane, cyclohexane or methylcyclohexane, or an aromatic hydrocarbon, such as benzene, toluene or xylene.

The polymerization can be carried out continuously or batchwise. The polymerization is generally carried out at a temperature of between 20° C. and 150° C. and preferably in the vicinity of 30° C. to 110° C.

The coupling reaction of the living diene polymer obtained on conclusion of the first stage can take place at a temperature between −20 and 100° C. by addition of a nonpolymerizable coupling agent to the living polymer chains, or vice-versa. The mixing can be carried out by any appropriate means, in particular using any mixer disposing of stirring of static type and/or any dynamic mixer of fully stirred type known to a person skilled in the art. The time for reaction between the living diene polymer and the coupling agent can be between 10 seconds and 2 hours.

Suitable coupling agents are all the compounds corresponding to the formula $RSiX_n$ in which R represents a primary or secondary alkyl, cycloalkyl or aryl group having from 1 to 20 carbon atoms, X represents a halogen atom, preferably chlorine or bromine, and n is the integer 3. The ratio for the coupling between the coupling agent $RSiX_n$ and the metal of the initiator of the living polymer chains is between 0.4 and 1.0 and preferably between 0.5 and 0.7.

The solvent used for the coupling reaction of the polymer chains is preferably the same as the inert hydrocarbon solvent used for the polymerization and is preferably cyclohexane or any other aliphatic hydrocarbon solvent. The solvent/monomer(s) ratio by weight before the reaction will be between 1 and 15 and preferably between 4 and 7. The polymerization process can be carried out according to a continuous or batchwise process.

The coupled diene polymers which have a silanol functional group in the middle of the chain and which are prepared according to the process in accordance with the invention have a number-average molecular weight Mn, determined by the conventional SEC technique, of between 100 000 g/mol and 350 000 g/mol and preferably between 114 000 g/mol and 185 000 g/mol.

The Mooney viscosity (ML1+4 at 100° C.) will preferably be between 20 and 150.

The coupled diene polymers which have a silanol functional group in the middle of the chain and which are prepared according to the process in accordance with the invention are recovered according to conventional recovery methods, in particular by drying under hot conditions and/or under reduced pressure or by stripping.

Another aim and subject-matter of the invention is a crosslinkable or crosslinked rubber composition based on at least one or more monomodal coupled diene polymer(s) having a silanol functional group in the middle of the chain, an overall level of Si functional group L (which is the ratio $N_s/N_p$, in which $N_s$ represents the number of moles of silicon bonded to the coupled polymer, determined by $^1H$ nuclear magnetic resonance NMR and expressed in mmol/kg, and $N_p$ represents the number of moles of polymer before coupling per kilogram of polymer) ranging from 0.36 to 0.60 (e.g., a level of Si functional group ranging from 36% to 60%), a level of silanol functional group (SiOH) in the middle of the chain L1, determined by 2D $^1H$-$^{29}Si$ nuclear magnetic resonance NMR, ranging from 80 to 100% and a monomodal distribution of the number-average molecular weights of the coupled polymer chains and on a reinforcing inorganic filler which exhibits reduced hysteresis losses in the crosslinked state and an improved ability to be processed in the noncrosslinked state and which has a particular ability to be used to form rubber compositions.

This aim is achieved in that the Applicant Company has just discovered, surprisingly, that a crosslinked rubber composition, obtained by the combination with a reinforcing inorganic filler of at least one monomodal coupled diene elastomer according to the invention which comprises a silanol functional group in the middle of the chain, an overall level of Si functional group L (which is the ratio $N_s/N_p$, in which $N_s$ represents the number of moles of silicon bonded to the coupled polymer, determined by $^1H$ nuclear magnetic resonance NMR and expressed in mmol/kg, and $N_p$ represents the number of moles of polymer before coupling per kilogram of polymer) ranging from 0.36 to 0.60 (i.e., a level of Si functional group ranging from 36% to 60%), a level of silanol functional group (SiOH) in the middle of the chain L1, determined by 2D $^1H$-$^{29}Si$ nuclear magnetic resonance NMR, ranging from 80 to 100% and a monomodal distribution of the number-average molecular weights of the coupled polymer chains, for example obtained according to the preparation process as described above, exhibits reduced hysteresis losses at small and at large strains, analogous to those exhibited by known compositions based on polymers comprising active functional groups at the chain end, in particular a silanol functional group, and which are improved in comparison with those of the compositions based on nonfunctionalized polymers comprising silica as filler, while having processing properties in the noncrosslinked state which are improved in comparison with those of the known compositions comprising silica as filler and which have functional diene polymers carrying a silanol functional group at the chain end and which are comparable with those of compositions based on nonfunctionalized polymers comprising silica as filler.

The characteristics of the monomodal coupled diene elastomer comprising a silanol functional group in the middle of the chain, an overall level of functional group (Si) L ranging from 0.36 to 0.60 and a level of silanol functional group (SiOH) in the middle of the chain L1 ranging from 80 to 100% according to the invention make it possible to use the elastomer to form a rubber composition which can advantageously be used as tyre tread exhibiting in particular a reduced rolling resistance for a new or retreaded tyre or as mixture internal to the tyre, for example for producing underlayers or for the calendering of crown or carcass reinforcements.

Another subject-matter of the invention is a tyre comprising a tread based on a rubber composition based on at least one monomodal coupled diene polymer according to the invention having a silanol functional group in the middle of the chain, an overall level of Si functional group L (which is the ratio $N_s/N_p$, in which $N_s$ represents the number of moles of silicon bonded to the coupled polymer, determined by $^1$H nuclear magnetic resonance NMR and expressed in mmol/kg, and $N_p$ represents the number of moles of polymer before coupling per kilogram of polymer) ranging from 0.36 to 0.60 (i.e., a level of Si functional group ranging from 36% to 60%), a level of silanol functional group (SiOH) in the middle of the chain L1, determined by 2D $^1$H-$^{29}$Si nuclear magnetic resonance NMR, ranging from 80 to 100% and a monomodal distribution of the number-average molecular weights of the coupled polymer chains and on a reinforcing inorganic filler.

According to a preferred characteristic of the invention, the said composition is based on an elastomer matrix predominantly comprising at least one monomodal coupled diene elastomer having a silanol functional group in the middle of the chain, an overall level of Si functional group L (which is the ratio $N_s/N_p$, in which $N_s$ represents the number of moles of silicon bonded to the coupled polymer, determined by $^1$H nuclear magnetic resonance NMR and expressed in mmol/kg, and $N_p$ represents the number of moles of polymer before coupling per kilogram of polymer) ranging from 0.36 to 0.60 (i.e., a level of Si functional group ranging from 36% to 60%), a level of silanol functional group (SiOH) in the middle of the chain L1, determined by 2D $^1$H-$^{29}$Si nuclear magnetic resonance NMR, ranging from 80 to 100% and a monomodal distribution of the number-average molecular weights of the coupled polymer chains; more preferably still, this elastomer matrix is composed solely of the said monomodal coupled diene elastomer having a silanol functional group in the middle of the chain.

The expression composition "based on" should be understood as meaning a composition comprising the mixture and/or the in situ reaction product of the various constituents used, some of these base constituents being capable of or intended to react with one another, at least in part, during the various phases of the manufacture of the composition, in particular during the crosslinking thereof.

Of course, the compositions according to the invention can comprise just one monomodal coupled diene elastomer having a silanol functional group in the middle of the chain, an overall level of Si functional group L (which is the ratio $N_s/N_p$, in which $N_s$ represents the number of moles of silicon bonded to the coupled polymer, determined by $^1$H nuclear magnetic resonance NMR and expressed in mmol/kg, and $N_p$ represents the number of moles of polymer before coupling per kilogram of polymer) ranging from 0.36 to 0.60 (i.e., a level of Si functional group ranging from 36% to 60%), a level of silanol functional group (SiOH) in the middle of the chain L1, determined by 2D $^1$H-$^{29}$Si nuclear magnetic resonance NMR, ranging from 80 to 100% and a monomodal distribution of the number-average molecular weights of the coupled polymer chains, such as that mentioned above, or a mixture of several of the said elastomers.

The monomodal coupled diene elastomer(s) having a silanol functional group in the middle of the chain, an overall level of Si functional group L (which is the ratio $N_s/N_p$, in which $N_s$ represents the number of moles of silicon bonded to the coupled polymer, determined by $^1$H nuclear magnetic resonance NMR and expressed in mmol/kg, and $N_p$ represents the number of moles of polymer before coupling per kilogram of polymer) ranging from 0.36 to 0.60 (i.e., a level of Si functional group ranging from 36% to 60%), a level of silanol functional group (SiOH) in the middle of the chain L1, determined by 2D $^1$H-$^{29}$Si nuclear magnetic resonance NMR, ranging from 80 to 100% and a monomodal distribution of the number-average molecular weights of the coupled polymer chains according to the invention can be used alone in the composition in accordance with the invention or by blending with any other functionalized or nonfunctionalized diene elastomer which is conventionally used in tyres.

It should be noted that the improvement in the properties of the composition according to the invention will increase as a proportion of the conventional elastomer or elastomers in this composition decreases.

In the present patent application, "reinforcing inorganic filler" is understood to mean, in a known way, an inorganic or mineral filler, whatever its colour and its origin (natural or synthetic), also known as "white" filler or sometimes "clear" filler, in contrast to carbon black (regarded as an organic filler in the context of the present description), this inorganic filler being capable of reinforcing, by itself alone, without other means than an intermediate coupling agent, a rubber composition intended for the manufacture of tyres, in other words capable of replacing, in its reinforcing role, a conventional carbon black filler of tyre grade. Such a filler is generally characterized, in a known way, by the presence of hydroxyl (—OH) groups at its surface, requiring in this the use of a coupling agent or system intended to provide a stable bond between the elastomer and the filler.

Preferably, the reinforcing inorganic filler is present in the composition of the invention according to an amount of between 20 and 200 pce [pce: parts by weight per one hundred parts of elastomer(s)], more preferably between 40 and 150 pce, the optimum being different according to the applications targeted. Preferably also, the said reinforcing inorganic filler is present in the reinforcing filler which the composition of the invention comprises according to a fraction by weight of greater than 50% and which can range up to 100%.

Advantageously, the said reinforcing inorganic filler is, in its entirety or at least predominantly, silica ($SiO_2$). The silica used can be any reinforcing silica known to a person skilled in the art, in particular any precipitated or pyrogenic silica exhibiting a BET specific surface and a CTAB specific surface both of less than 450 m$^2$/g, even if highly dispersible precipitated silicas are preferred.

In the present account, the BET specific surface is determined in a known way according to the Brunauer-Emmet-Teller method described in "The Journal of the American Chemical Society", Vol. 60, page 309, February 1938, and corresponding to Standard AFNOR-NFT-45007 (November 1987); the CTAB specific surface is the external surface determined according to the same Standard AFNOR-NFT-45007 of November 1987.

Highly dispersible silica is understood to mean any silica having a very high ability to deagglomerate and to disperse in an elastomer matrix observable in a known way by electron or optical microscopy on thin sections. Mention may be made, as nonlimiting examples of such preferred highly dispersible silicas, of the silica Perkasil KS 430 from Akzo, the silica BV 3380 from Degussa, the silicas Zeosil 1165 MP, 1135 MP and 1115 MP from Rhodia, the silicas Hi-Sil 2000 and Hi-Sil EZ 150G from PPG, the silicas Zeopol 8715, 8755 or 8745 from Huber, as described in Application WO 03/016387, or treated precipitated silicas, such as, for example, the silicas "doped" with aluminium described in the document of Patent EP-A-735 088.

The physical state in which the reinforcing inorganic filler is provided is not important, whether in the form of a powder, microbeads, granules or beads. Of course, reinforcing inorganic filler is also understood to mean mixtures of different reinforcing inorganic fillers, in particular of highly dispersible silicas as described above. Also suitable as reinforcing inorganic filler is highly dispersible alumina ($Al_2O_3$) having a BET specific surface ranging from 30 to 400 $m^2/g$, more preferably between 60 and 250 $m^2/g$, and a mean particle size at most equal to 500 nm, more preferably at most equal to 200 nm. Mention may in particular be made, as nonlimiting examples of such reinforcing aluminas, of the aluminas "Baikalox A125" or "CR125" (Baïkowski), "APA-100RDX" (Condea), "Aluminium Oxide C" (Degussa) or "AKP-G015" (Sumitomo Chemicals).

It should be noted that the reinforcing filler of a rubber composition according to the invention can comprise as a blend (mixture), in addition to the abovementioned reinforcing inorganic filler or fillers, carbon black in a minor amount (that is to say, according to a fraction by weight of less than 50%) or inert (nonreinforcing) fillers. Suitable carbon blacks are all carbon blacks, in particular blacks of the HAF, ISAF and SAF types, conventionally used in tyres and particularly in tyre treads. Mention may be made, as nonlimiting examples of such blacks, of the blacks N115, N134, N234, N339, N347 and N375. Suitable nonreinforcing inorganic fillers are particles of clay, bentonite, talc, chalk or kaolin.

For example, black/silica blends or blacks partially or completely covered with silica are suitable for constituting the reinforcing filler. Also suitable are reinforcing fillers comprising carbon blacks covered, at least in part, with an inorganic layer, for example with silica, requiring for its part the use of a coupling agent in order to establish the connection with the elastomer, such as, without implied limitation, the fillers which are sold by Cabot under the name "CRX 2000" and which are described in the document of Patent WO-A-96/37547.

Use may also be made, as reinforcing inorganic filler, without implied limitation, of aluminas (of formula $Al_2O_3$), such as the aluminas possessing high dispersibility which are described in the document of European Patent EP-A-810 258, or also of aluminium hydroxides, such as are described in the document of Patent WO-A-99/28376.

In the case where the reinforcing filler comprises only a reinforcing inorganic filler and carbon black, the fraction by weight of this carbon black in the said reinforcing filler is preferably chosen to be less than or equal to 30%.

However, experience shows that the abovementioned properties of the composition according to the invention are improved in proportion as a reinforcing filler which it comprises comprises a greater fraction by weight of reinforcing inorganic filler and that the said properties are optimal when the said composition comprises solely a reinforcing inorganic filler, for example silica, as reinforcing filler. The latter case thus constitutes a preferred example of rubber composition according to the invention.

The rubber composition according to the invention in addition conventionally comprises a reinforcing inorganic filler/elastomer matrix bonding agent.

Bonding agent is understood to mean more specifically an agent capable of establishing a satisfactory connection of chemical and/or physical nature between the filler under consideration and the elastomer, while facilitating the dispersion of this filler in the elastomer matrix. Such an at least bifunctional bonding agent has, for example, the simplified general formula "Y-T-X", in which:
  Y represents a functional group ("Y" functional group) which is capable of being bonded physically and/or chemically to the inorganic filler, it being possible for such a bond to be established, for example, between a silicon atom of the coupling agent and the surface hydroxyl (OH) groups of the inorganic filler (for example, surface silanols when silica is involved);
  X represents a functional group ("X" functional group) capable of being bonded physically and/or chemically to the elastomer, for example via a sulphur atom;
  T represents a divalent group which makes it possible to connect Y and X.

The bonding agents must not be confused with simple agents for covering the filler under consideration which, in a known way, can comprise the Y functional group active with regard to the filler but are devoid of the X functional group active with regard to the elastomer. Use may be made of any bonding agent known for, or capable of efficiently providing, in rubber compositions that can be used for the manufacture of tyres, the bonding (or the coupling) between a reinforcing inorganic filler, such as silica, and a diene elastomer, such as, for example, organosilanes, in particular alkoxysilane polysulphides or mercaptosilanes, or also polyorganosiloxanes carrying the abovementioned X and Y functional groups. Silica/elastomer bonding agents, in particular, have been described in a large number of documents, the best known being bifunctional alkoxysilanes, such as alkoxysilane polysulphides.

Use is made in particular of alkoxysilane polysulphides, known as "symmetrical" or "asymmetrical", according to their specific structure, as described, for example, in U.S. Pat. No. 3,842,111, U.S. Pat. No. 3,873,489, U.S. Pat. No. 3,978,103, U.S. Pat. No. 3,997,581, U.S. Pat. No. 4,002,594, U.S. Pat. No. 4,072,701 and U.S. Pat. No. 4,129,585 or in the more recent U.S. Pat. No. 5,580,919, U.S. Pat. No. 5,583,245, U.S. Pat. No. 5,650,457, U.S. Pat. No. 5,663,358, U.S. Pat. No. 5,663,395, U.S. Pat. No. 5,663,396, U.S. Pat. No. 5,674,932, U.S. Pat. No. 5,675,014, U.S. Pat. No. 5,684,171, U.S. Pat. No. 5,684,172, U.S. Pat. No. 5,696,197, U.S. Pat. No. 5,708,053, U.S. Pat. No. 5,892,085, EP-A-1 043 357, WO 03/002648 (or US 2005/0016651) and WO 03/002649 (or US 2005/0016650), which set out in detail such known compounds.

Suitable in particular, without the definition below being limiting, are symmetrical alkoxysilane polysulphides corresponding to the following general formula (I):

$$Z\text{-}A\text{-}S_n\text{-}A\text{-}Z, \quad (I)$$

in which:
  n is an integer from 2 to 8 (preferably from 2 to 5);
  A is a divalent hydrocarbon radical (preferably $C_1$-$C_{18}$ alkylene groups or $C_6$-$C_{12}$ arylene groups, more particularly $C_1$-$C_{10}$ alkylenes, in particular $C_1$-$C_4$ alkylenes, in particular propylene);

Z corresponds to one of the following formulae:

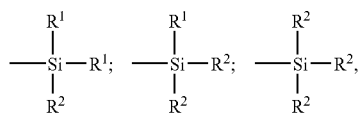

in which:
- the substituted or unsubstituted $R^1$ radicals, which are identical to or different from one another, represent a $C_1$-$C_{18}$ alkyl, $C_5$-$C_{18}$ cycloalkyl or $C_5$-$C_{18}$ aryl group (preferably $C_1$-$C_6$ alkyl, cyclohexyl or phenyl groups, in particular $C_1$-$C_4$ alkyl groups, more particularly methyl and/or ethyl);
- the substituted or unsubstituted $R^2$ radicals, which are identical to or different from one another, represent a hydroxyl, $C_1$-$C_{18}$ alkoxyl or $C_5$-$C_{18}$ cycloalkoxyl group (preferably $C_1$-$C_8$ alkoxyl or $C_5$-$C_8$ cycloalkoxyl groups, more preferably $C_1$-$C_4$ alkoxyl groups, in particular methoxyl and/or ethoxyl).

In the case of a mixture of alkoxysilane polysulphides corresponding to the above formula (I), in particular normal commercially available mixtures, it will be understood that the mean value of the "n" symbols is a fractional number, preferably ranging from 2 to 5 and more preferably approximately 4.

Mention will more particularly be made, as alkoxysilane polysulphides, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl) tetrasulphide, abbreviated to TESPT, of formula $[(C_2H_5O)_3Si(CH_2)_3S_2]_2$, or bis(3-triethoxysilylpropyl) disulphide, abbreviated to TESPD, of formula $[(C_2H_5O)_3Si(CH_2)_3S]_2$. TESPD is sold, for example, by Degussa under the names Si266 or Si75 (in the second case, in the form of a mixture of disulfide (at 75% by weight) and of polysulphides) or by Witco under the name Silquest A1589. TESPT is sold, for example, by Degussa under the name Si69 (or X50S, when it is supported at 50% by weight on carbon black) or by Osi Specialties under the name Silquest A1289 (in both cases, commercial mixture of polysulphides with a mean value for n which is approximately 4). Mention will also be made of bis(mono($C_1$-$C_4$)alkoxyldi($C_1$-$C_4$)alkylsilylpropyl) polysulphides (in particular disulphides, trisulphides or tetrasulphides), more particularly bis (monoethoxydimethylsilylpropyl) tetrasulphide (abbreviated to MESPT) or disulphide, which form the subject-matter of International Patent Application WO 02/083782 (or US 2004/0132880) on behalf of the Applicant Companies.

Mention will in particular be made, as examples of coupling agents other than the abovementioned alkoxysilane polysulphides, of bifunctional polyorganosiloxanes or of hydroxysilane polysulphides, such as described in Applications WO 02/30939 and WO 02/41041.

In the compositions in accordance with the invention, the level of coupling agent is advantageously less than 20 pce and preferably less than 10 pce, it being understood that it is generally desirable to use the least possible thereof, and adjusted to the amount of reinforcing inorganic filler.

The compositions in accordance with the invention also comprise, in addition to the said monomodal coupled diene elastomer having a silanol functional group in the middle of the chain, an overall level of Si functional group L (which is the ratio $N_s/N_p$, in which $N_s$ represents the number of moles of silicon bonded to the coupled polymer, determined by $^1$H nuclear magnetic resonance NMR and expressed in mmol/kg, and $N_p$ represents the number of moles of polymer before coupling per kilogram of polymer) ranging from 0.36 to 0.60 (i.e., a level of Si functional group ranging from 36% to 60%), a level of silanol functional group (SiOH) in the middle of the chain L1, determined by 2D $^1$H-$^{29}$Si nuclear magnetic resonance NMR, ranging from 80 to 100% and a monomodal distribution of the number-average molecular weights of the coupled polymer chains and the said reinforcing inorganic filler, plasticizers, pigments, antioxidants, antifatigue agents, antiozonant waxes, adhesion promoters, reinforcing or plasticizing resins, for example as described in the document WO 02/10269, peroxides and/or bismaleimides, methylene acceptors (for example, phenolic novolak resin) or methylene donors (for example, HMT or H3M), a crosslinking system based either on sulphur and/or on peroxides and/or on bismaleimides, crosslinking activators comprising zinc monoxide and stearic acid, guanidine derivatives (in particular diphenylguanidine), extending oils, one or more agents for covering silica, such as alkoxysilanes, polyols or amines.

In particular, these compositions can be such that the said monomodal coupled diene elastomer having a silanol functional group in the middle of the chain, an overall level of Si functional group L (which is the ratio $N_s/N_p$, in which $N_s$ represents the number of moles of silicon bonded to the coupled polymer, determined by $^1$H nuclear magnetic resonance NMR and expressed in mmol/kg, and $N_p$ represents the number of moles of polymer before coupling per kilogram of polymer) ranging from 0.36 to 0.60 (i.e., a level of Si functional group ranging from 36% to 60%), a level of silanol functional group (SiOH) in the middle of the chain L1, determined by 2D $^1$H-$^{29}$Si nuclear magnetic resonance NMR, ranging from 80 to 100% and a monomodal distribution of the number-average molecular weights of the coupled polymer chains is extended with an aromatic or nonaromatic or very slightly aromatic oil chosen from the group consisting of a paraffinic oil, a naphthenic oil, MES oil, TDAE oil, glycerol esters, plasticizing hydrocarbon resins exhibiting a high Tg preferably of greater than 30° C. and the mixtures of such plasticizers, with an amount of extending oil of between 0 and 50 pce.

Another subject-matter of the invention is a process for the preparation of a crosslinkable rubber composition in accordance with the invention. This process comprises:

(i) carrying out, at a maximum temperature of between 130° C. and 200° C., a first step of thermomechanical working (sometimes described as "nonproductive" phase) of the base constituents necessary, with the exception of the crosslinking system, for the said composition comprising the said monomodal coupled diene elastomer having a silanol functional group in the middle of the chain, an overall level of Si functional group L (which is the ratio $N_s/N_p$, in which $N_s$ represents the number of moles of silicon bonded to the coupled polymer, determined by $^1$H nuclear magnetic resonance NMR and expressed in mmol/kg, and $N_p$ represents the number of moles of is polymer before coupling per kilogram of polymer) ranging from 0.36 to 0.60 (i.e., a level of Si functional group ranging from 36% to 60%), a level of silanol functional group (SiOH) in the middle of the chain L1, determined by 2D $^1$H-$^{29}$Si nuclear magnetic resonance NMR, ranging from 80 to 100% and a monomodal distribution of the number-average molecular weights of the coupled polymer chains and a reinforcing inorganic filler, with the exception of a crosslinking system, then (ii) carrying out, at a temperature lower than the said maximum temperature of the said first step, preferably of less than 120° C., a second step of mechanical working during which the said crosslinking system is incorporated,
(iii) extruding or calendering the rubber composition thus obtained, in the desired form, in order to manufacture semifinished products, such as treads.

This process can also comprise the preparation of a monomodal coupled diene elastomer having a silanol functional group in the middle of the chain, an overall level of Si functional group L (which is the ratio $N_s/N_p$, in which $N_s$ represents the number of moles of silicon bonded to the coupled polymer, determined by $^1$H nuclear magnetic resonance NMR and expressed in mmol/kg, and $N_p$ represents the number of moles of polymer before coupling per kilogram of polymer) ranging from 0.36 to 0.60 (i.e., a level of Si functional group ranging from 36% to 60%), a level of silanol functional group (SiOH) in the middle of the chain L1, determined by 2D $^1$H-$^{29}$Si nuclear magnetic resonance NMR, ranging from 80 to 100% and a monomodal distribution of the number-average molecular weights of the coupled polymer chains which consists, in a first stage, in reacting the monomer(s), in the presence or absence of an inert hydrocarbon solvent, in the presence of a chelating polar agent having at least one nonbonding doublet at least on two atoms, with a polymerization initiator, in order to form a living diene polymer, and in reacting, in a second stage, as known per se, the said living polymer with a coupling agent for polymer chains, in order to obtain, after hydrolysis, the monomodal coupled diene polymer having a silanol functional group in the middle of the chain, prior to carrying out the abovementioned stages (i), (ii) and (iii).

Another subject-matter of the invention is a tyre tread which is such that it comprises a crosslinkable or crosslinked rubber composition such as that mentioned above or else which is such that it is composed of this composition.

Due to the reduced hysteresis which characterizes a rubber composition according to the invention in the crosslinked state, it should be noted that a tyre having a tread comprising the said composition exhibits an advantageously reduced rolling resistance.

A tyre according to the invention is such that it comprises this tread.

BRIEF DESCRIPTION OF THE FIGURES

The abovementioned characteristics of the present invention, and others, will be better understood on reading the following description of several exemplary embodiments of the invention in connection with the appended FIGS. 1 to 6, which represent the distributions of the weight-average molecular weights Mi, determined by the SEC technique, respectively of the copolymers A, B, E, F, G and H in accordance with the invention. In these figures, the x axis represents, in decimal logarithmic form, a scale of the molecular weights (Mi) in g/mol of the polymers; the y axis represents an arbitrary scale proportional to the weight of polymer of number-average molecular weight Mi.

Figure 1:
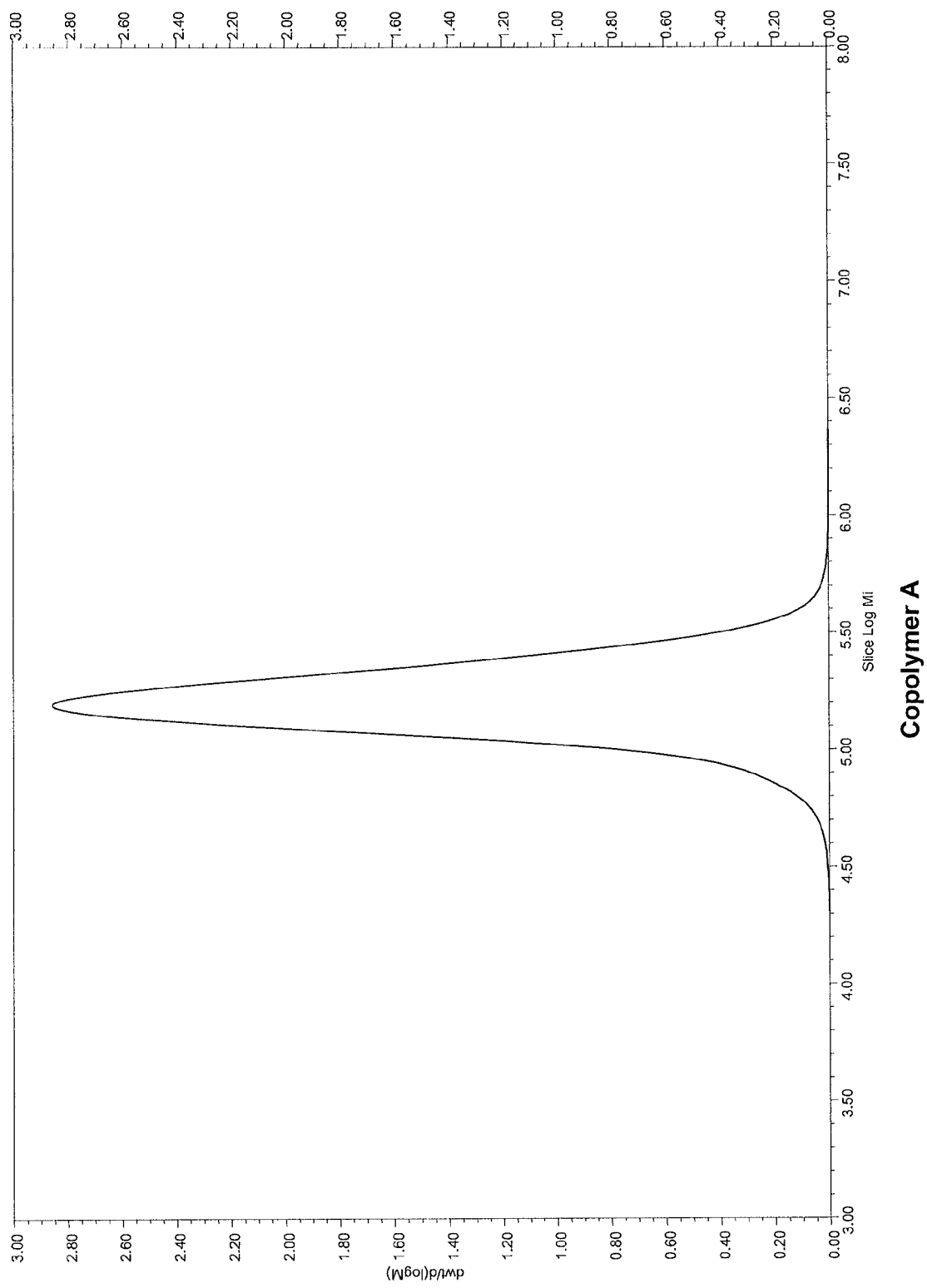
Figure 2:
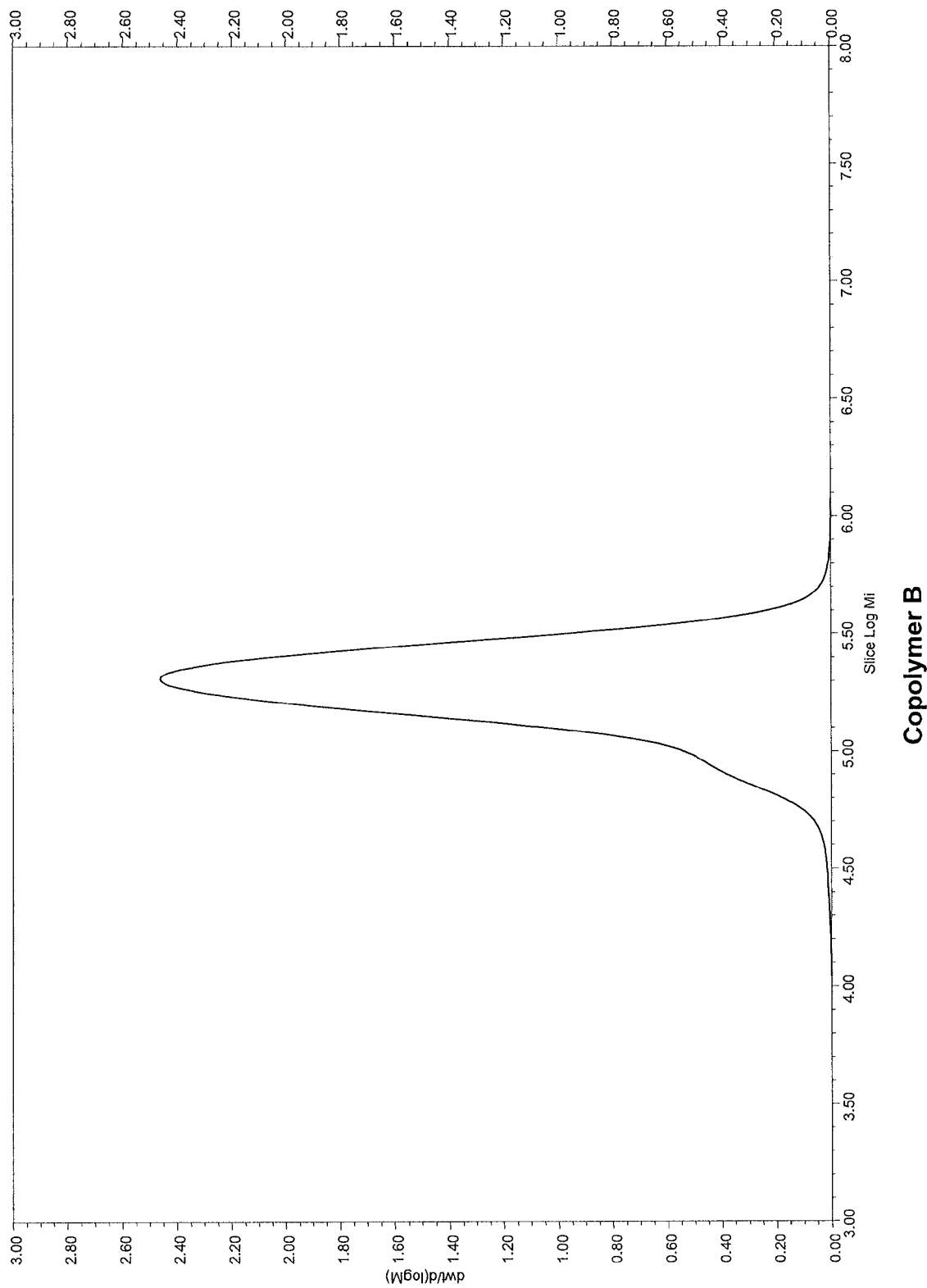
Figure 3:
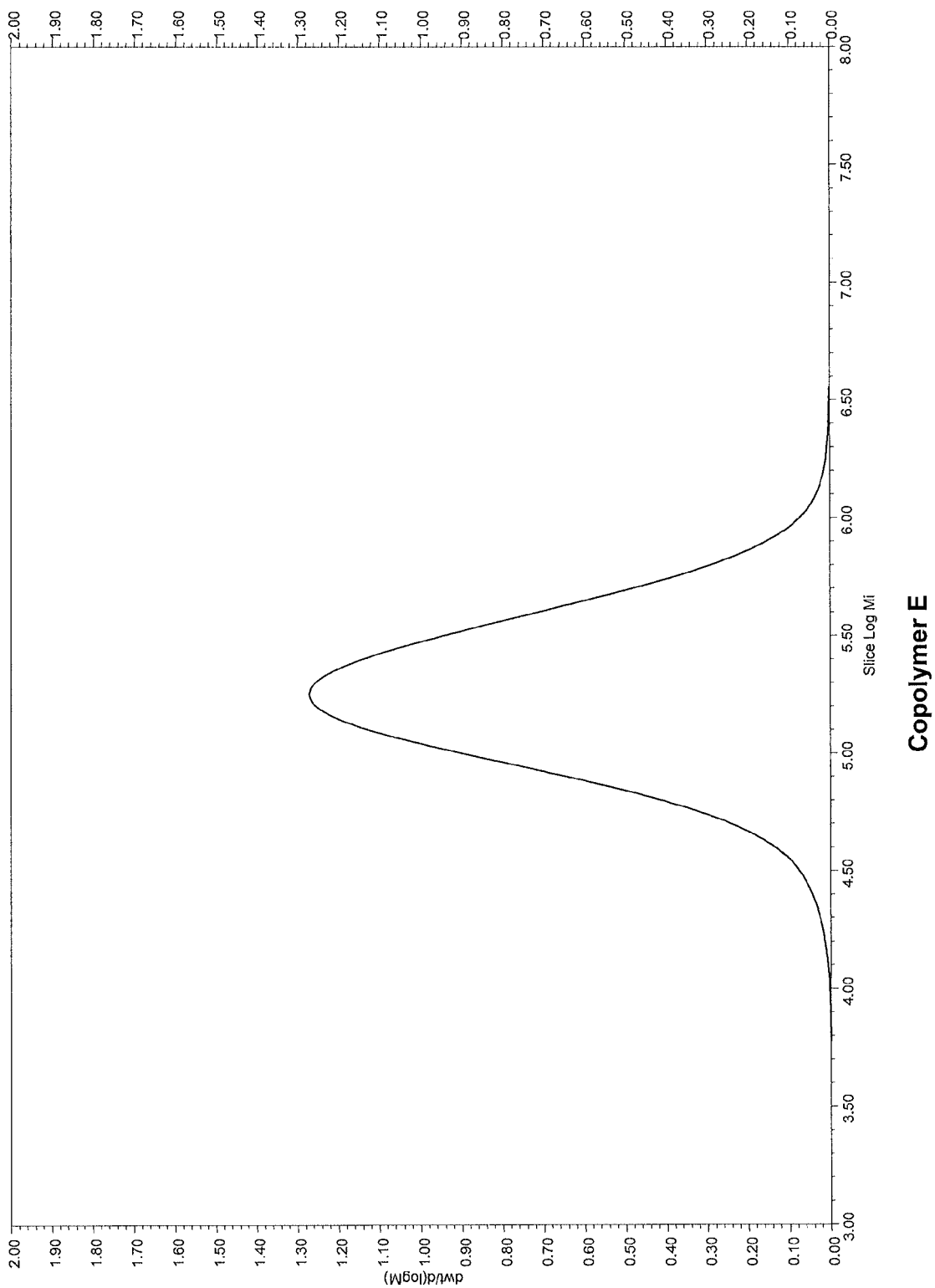
Figure 4:
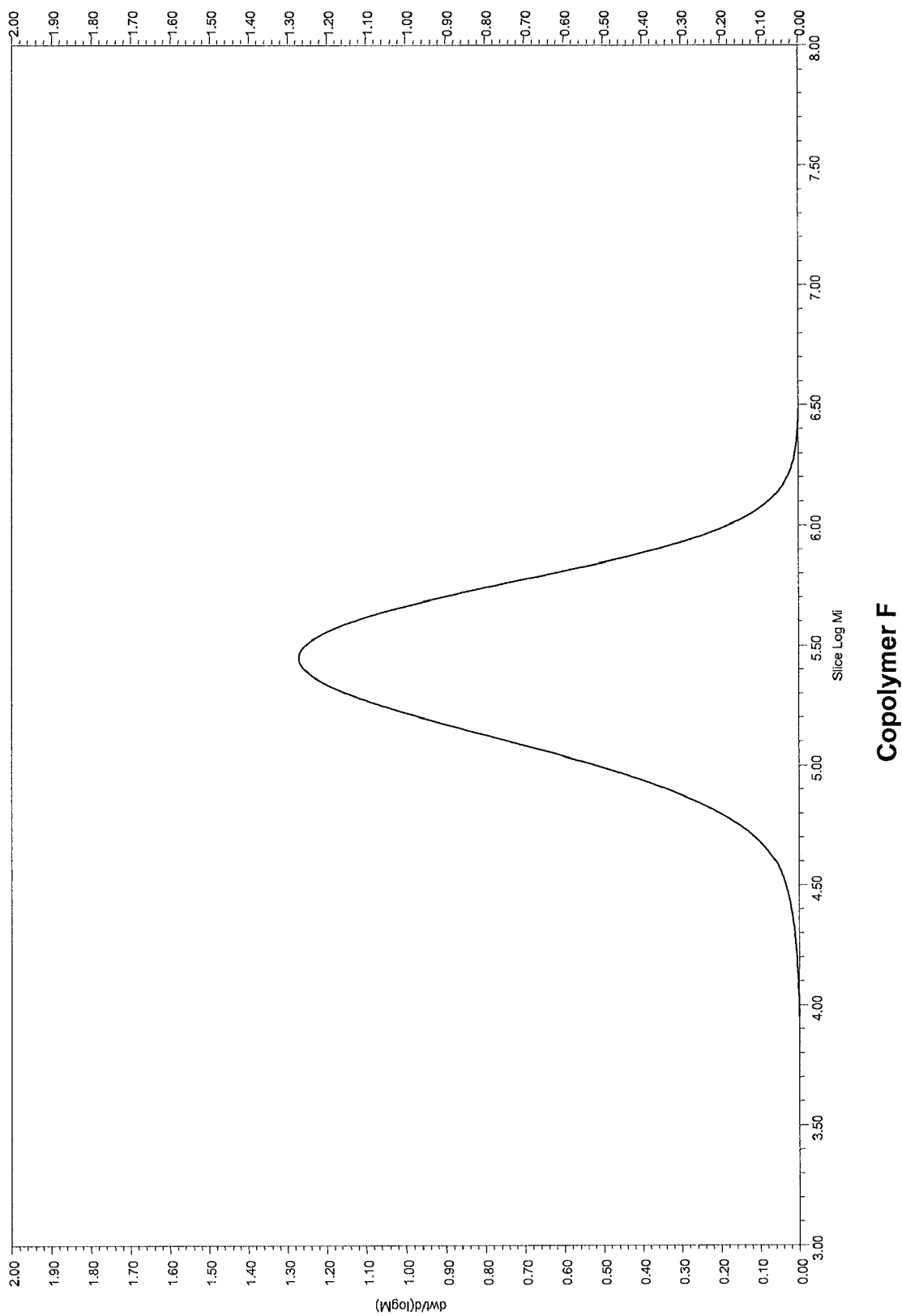
Figure 5:
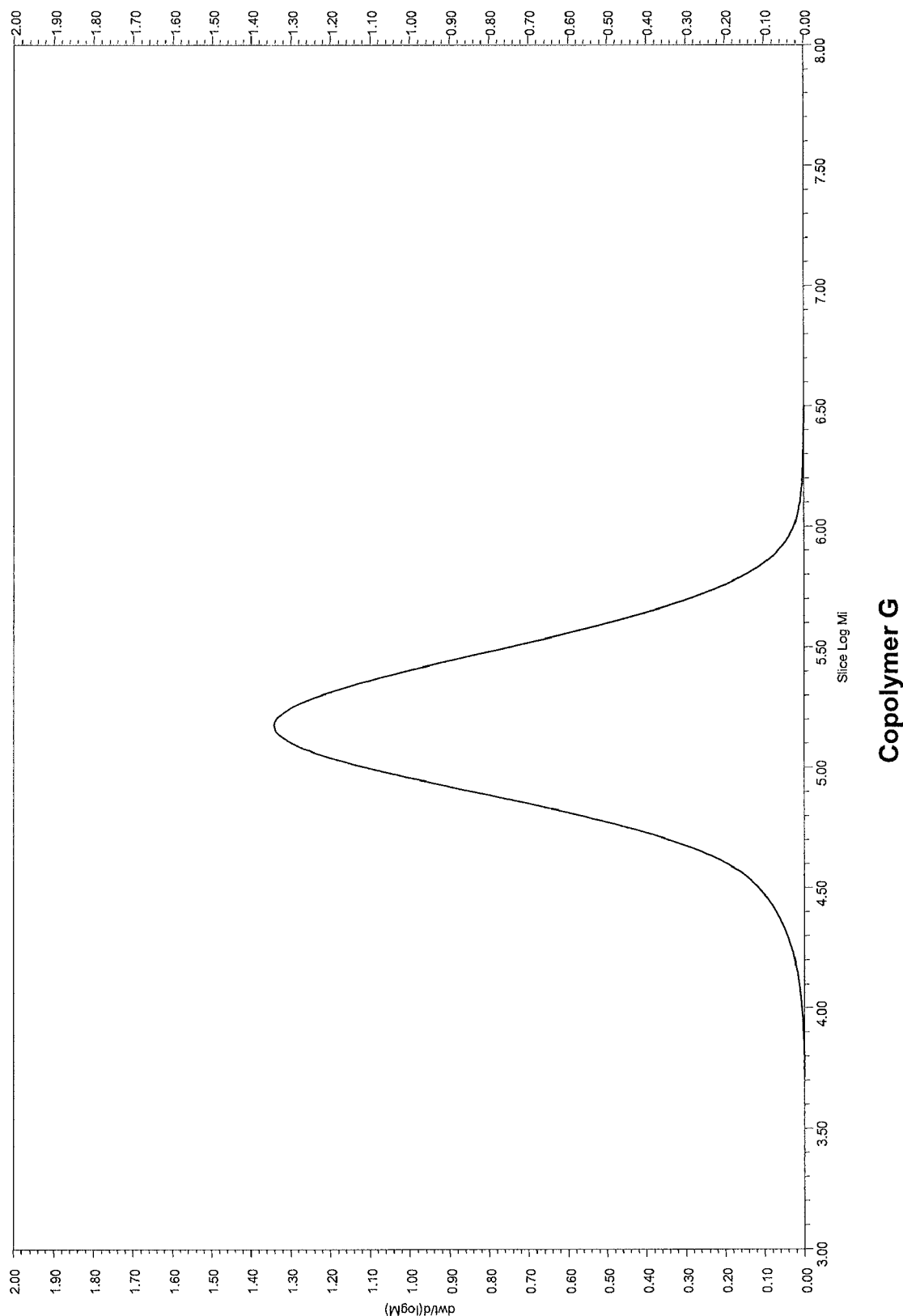
Figure 6:
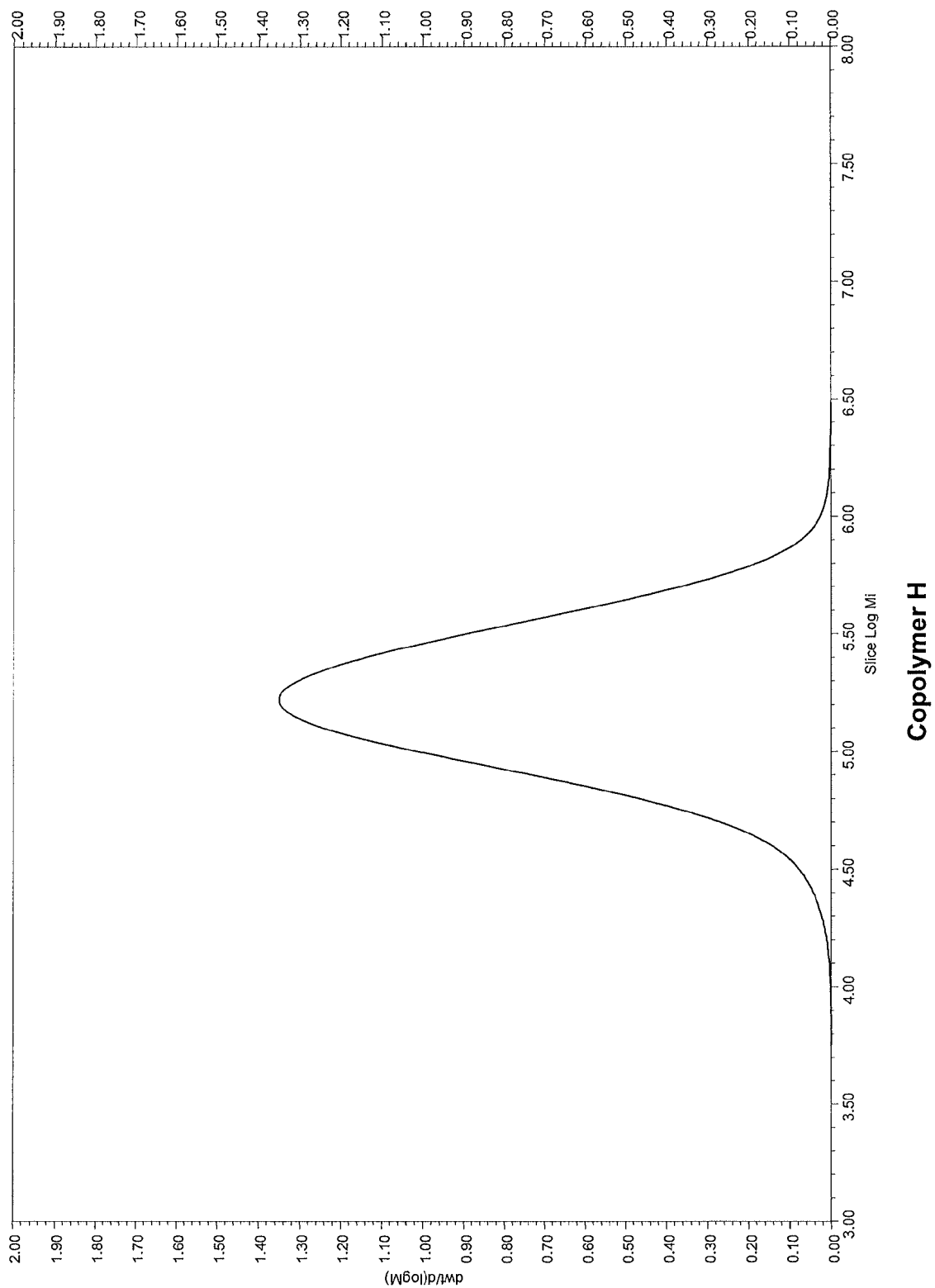

EXAMPLE 1:
Synthesis of SBR according to a batchwise method

Coupled copolymer A having an SiOH functional group in the middle of the chain according to the invention Coupled copolymer B prepared in the presence of a nonchelating polar agent
"Control" SBR copolymers C and D having an SiOH functional group at the chain end and nonfunctional 1) Preparation Using a Chelating Polar Agent of a Coupled Copolymer a Having an Si—OH Functional Group in the Middle of the Chain According to the Invention:

105 grams of cyclohexane (135 ml), butadiene and styrene, according to the respective ratios by weight 1/0.091/0.051, are introduced into a 0.25 l "control" bottle maintained under nitrogen and into another identical bottle intended for the implementation of the invention. 22 ppm of tetrahydrofurfuryl ethyl ether are also introduced as promoting agent for vinyl bonds. After neutralizing the impurities using n-butyllithium (n-BuLi), 123 μmol of n-butyllithium are added. Polymerization is carried out in each of the two bottles at 40° C. and the level of monomer converted is 76% after 100 min. This level is determined by weighing an extract dried at 110° C. under a reduced pressure of 200 mmHg.

In the "control" bottle containing the polymerization product, the polymerization is halted with an excess of methanol with respect to the lithium. The intrinsic viscosity ("starting" viscosity), which is measured at 25° C. at 0.1 g/dl in toluene, is 0.94 dl/g. The molecular weight Mn of this control, determined by the SEC3D technique, is 92 000 g/mol and the PI is 1.07.

Coupling Using a Coupling Agent According to the Invention:

A methyltrichlorosilane (61 μmol) solution is injected into the second bottle containing this same polymerization product. The Si/Li ratio is thus 0.50. After reacting at 0° C. for 20 min, the coupling reaction is halted with an excess of water with respect to the lithium in order to hydrolyse the remaining SiCl functional group. The "final" intrinsic viscosity measured is 1.52 dl/g.

The jump in viscosity, defined as the ratio of the said "final" viscosity to the said "starting" viscosity, is 1.62 in this instance. The ML viscosity of the polymer thus coupled is 41.

The coupled copolymer A functionalized with SiOH in the middle of the chain thus obtained is subjected to an antioxidizing treatment by addition of 0.35 part per one hundred parts of elastomers (pce) of 4,4'-methylenebis(2,6-di(tert-butyl)phenol) and 0.10 part per one hundred parts of elastomers (pce) of N-(1,3-dimethylbutyl)-N'-phenyl-p-phenylenediamine. This copolymer is recovered by drying in an oven at 60° C. under a stream of nitrogen.

The microstructure of this copolymer A is determined by $^{13}$C NMR:

The level by weight of 1,4-trans-units is 34%, that of 1,4-cis-units is 25% and that of 1,2-units is 41% (each of these three levels relates to the butadiene units).

The level by weight of styrene is 27%.

The molecular weight Mn of this copolymer A, determined by the conventional SEC technique, is 139 000 g/mol, the molecular weight Mw is 158 000 g/mol and the PI is 1.14.

The level of CH$_3$Si functional groups, determined by $^1$H NMR for the copolymer A, is 4.15 mmol/kg, which, taking into account the molecular weight Mn, corresponds to a level L of 0.38.

The 2D $^1$H-$^{29}$Si NMR analysis exhibits a single correlation spot at $à\delta_{Si}$=+8 ppm. It allows it to be concluded that the level of functionalization L1 is 100%, that is to say that the form is that with 100% CH$_3$Si(SBR)$_2$OH in the middle of the chain.

The NMR and SEC analyses illustrate the fact that the coupling reaction carried out in the presence of a chelating polar agent is particularly selective.

2) Preparation Using a Nonchelating Polar Agent of a Coupled Copolymer B Having an Si—OH Functional Group in the Middle of the Chain:

This test is a control with respect to the invention.

105 grams of cyclohexane (135 ml), butadiene and styrene, according to the respective ratios by weight 1/0.104/0.045, are introduced into a 0.25 l "control" bottle maintained under nitrogen and into another identical bottle intended for the implementation of the invention. 2 600 ppm of tetrahydrofuran are also introduced as promoting agent for vinyl bonds. After neutralizing the impurities using n-BuLi, 123 μmol of n-butyllithium are added. Polymerization is carried out in each of the two bottles at 40° C. and the level of monomer converted is 78% after 100 min. This level is determined by weighing an extract dried at 110° C. under a reduced pressure of 200 mmHg.

In the "control" bottle containing the polymerization product, the polymerization is halted with an excess of methanol with respect to the lithium. The intrinsic viscosity ("starting" viscosity), which is measured at 25° C. at 0.1 g/dl in toluene, is 0.92 dl/g. The molecular weight Mn of this control, determined by the SEC3D technique, is 98 000 g/mol and the PI is 1.07.

Coupling Using a Coupling Agent:

A methyltrichlorosilane (61 μmol) solution is injected into the other bottle containing this same polymerization product. The Si/Li ratio is thus 0.50. After reacting at 0° C. for 20 min, the coupling reaction is halted with an excess of water with respect to the lithium in order to hydrolyse the remaining SiCl functional group. The "final" intrinsic viscosity measured is 1.85 dl/g.

The jump in viscosity, defined as the ratio of the said "final" viscosity to the said "starting" viscosity, is 2.01 in this instance. The ML viscosity of the polymer thus coupled is 60.

The coupled copolymer B functionalized with SiOH in the middle of the chain thus obtained is subjected to an antioxidizing treatment by addition of 0.35 part per one hundred parts of elastomers (pce) of 4,4'-methylenebis (2,6-di(tert-butyl)phenol) and 0.10 part per one hundred parts of elastomers (pce) of N-(1,3-dimethylbutyl)-N'-phenyl-p-phenylenediamine. This copolymer is recovered by drying in an oven at 60° C. under a stream of nitrogen.

The microstructure of this copolymer B is determined by $^{13}$C NMR:

The level by weight of 1,4-trans-BR is 34%, that of 1,4-cis-BR is 22% and that of 1,2-BR is 44% (each of these three levels relates to the butadiene units). The level by weight of styrene is 26%.

The molecular weight Mn of this copolymer B, determined by the conventional SEC technique, is 170 000 g/mol, the molecular weight Mw is 209 000 g/mol and the PI is 1.23.

The overall level of CH$_3$Si functional groups, determined by $^1$H NMR, for the copolymer B is 4.2 mmol/kg, which corresponds to a level L of 0.42.

The 2D $^1$H-$^{29}$Si NMR analysis exhibits three correlation spots at $à\delta_{Si}$=+8 ppm, corresponding to the expected product ((SBR)$_2$SiCH$_3$OH middle of chain form), at $à\delta_{Si}$=−8 ppm, corresponding to the geminal product (SBRSiCH$_3$(OH)$_2$ at the chain end form), and at $à\delta_{Si}$≈0 ppm, corresponding to the star-shaped product ((SBR)$_3$SiCH$_3$ form). The integration of the peak areas gives a distribution at 47% for the area at $à\delta_{Si}$=+8 ppm, at 35% for the area at $à\delta_{Si}$=−8 ppm and at 18% for the area at $à\delta_{Si}$≈0 ppm.

The copolymer B has a proportion of Si occurring in the form of SiOH functional groups in the middle of the chain of 47%.

The NMR and SEC analyses allow it to be concluded that several functional groups exist in high proportions, characterizing the fact that the coupling reaction carried out in the presence of a nonchelating polar agent is not selective.

3) Preparation of a "Control" SBR C Having an SiOH Functional Group at the Chain End:

This linear "control" SBR C functionalized with hexamethylcyclotrisiloxane is prepared by copolymerization of styrene and butadiene.

105 grams of cyclohexane (135 ml), butadiene and styrene, according to the respective ratios by weight of 1/0.091/0.051, are introduced into a 0.25 l bottle maintained under nitrogen. 15 ppm of tetrahydrofurfuryl ethyl ether are also introduced as promoting agent for vinyl bonds. After neutralizing the impurities, 90 μmol of n-butyllithium are added. Polymerization is carried out in the bottle at 40° C. and the level of monomer converted is 74% after 120 min. This level is determined by weighing an extract dried at 110° C. under a reduced pressure of 200 mmHg.

Functionalization Using Hexamethylcyclotrisiloxane:

A hexamethylcyclotrisiloxane (45 μmol) solution is injected into the bottle containing this polymerization product. The Si/Li ratio is thus 1.50. After reacting at 40° C. for 20 min, the functionalization reaction is halted with an excess of methanol with respect to the lithium. The "final" intrinsic viscosity, which is measured at 25° C. at 0.1 g/dl in toluene, is 1.59 dl/g.

The linear "control" copolymer C functionalized with hexamethylcyclotrisiloxane thus obtained is subjected to an antioxidizing treatment by addition of 0.35 part per one hundred parts of elastomers (pce) of 4,4'-methylenebis (2,6-di(tert-butyl)phenol) and 0.10 part per one hundred parts of elastomers (pce) of N-(1,3-dimethylbutyl)-N'-phenyl-p-phenylenediamine. This copolymer is recovered by drying in an oven at 60° C. under a stream of nitrogen.

The molecular weight Mn of this copolymer C, determined by the conventional SEC technique, is 133 000 g/mol.

The ML viscosity of the copolymer is 39.

The microstructure of this copolymer C is determined by $^{13}$C NMR: the level by weight of 1,4-trans-BR is 34%, that of 1,4-cis-BR is 25% and that of 1,2-BR is 41% (each of these three levels relates to the butadiene units).

The level by weight of styrene is 26%.

The 2D $^1$H-$^{29}$Si NMR analysis allows it to be concluded that a chain-end functional group of SBR(CH$_3$)$_2$SiOH type is present. The level of (CH$_3$)$_2$Si functional groups, determined by $^1$H NMR, for the copolymer C is 5.70 mmol/kg.

4) Preparation of a Nonfunctional "Control" SBR D:

This nonfunctional "control" SBR D is prepared by copolymerization of styrene and butadiene.

105 grams of cyclohexane (135 ml), butadiene and styrene, according to respective ratios by weight of 1/0.091/0.051, are introduced into a 0.25l bottle maintained under nitrogen and into another identical bottle, 15 ppm of tetrahydrofurfuryl ethyl ether are also introduced as promoting agent for vinyl bonds. After neutralizing the impurities using n-BuLi, 90 µmol of n-butyllithium are added. Polymerization is carried out in the bottle at 40° C. and the level of monomer converted is 75% after 123 min. This level is determined by weighing an extract dried at 110° C. under a reduced pressure of 200 mmHg.

In the bottle comprising the polymerization product, the polymerization is halted with an excess of methanol with respect to the lithium. The intrinsic viscosity, which is measured at 25° C. at 0.1 g/dl in toluene, is 1.59 dl/g.

The linear "control" copolymer D thus obtained is subjected to an antioxidizing treatment by addition of 0.35 part per one hundred parts of elastomers (pce) of 4,4'-methylenebis(2,6-di(tert-butyl)phenol) and 0.10 part per one hundred parts of elastomers (pce) of N-(1,3-dimethylbutyl)-N'-phenyl-p-phenylenediamine. This copolymer is recovered by drying in an oven at 60° C. under a stream of nitrogen.

The ML viscosity of the copolymer is 39.

The molecular weight Mn of this copolymer D, determined by the conventional SEC technique, is 143 000 g/mol.

The microstructure of this copolymer D is determined by $^{13}$C NMR: the level by weight of 1,4-trans-BR is 33%, that of 1,4-cis-BR is 24% and that of 1,2-BR is 43% (each of these three levels relates to the butadiene units).

The level by weight of styrene is 26%.

EXAMPLE 2:
Synthesis of SBR according to a continuous method

Coupled copolymers E, F, G and H having an SiOH functional group in the middle of the chain according to the invention, in comparison with "control" copolymers SBR I, J, K and L having an SiOH functional group at the chain end and nonfunctional 1) Preparation of a Coupled Copolymer E Having an Si—OH Functional Group in the Middle of the Chain According to the Invention:

Cyclohexane, butadiene, styrene and tetrahydrofurfuryl ethyl ether, according to respective flow rates by weight of 100/11/3.2/0.045, are introduced continuously into a 32.5 l reactor equipped with a stirrer of turbine type. 160 micromol of n-butyllithium (n-BuLi) per 100 g of monomers are introduced at the line inlet in order to neutralize the protic impurities introduced by the various constituents present in the line inlet. 1160 µmol of n-BuLi per 100 g of monomers are introduced at the reactor inlet.

The various flow rates are adjusted so that the mean residence time in the reactor is 40 minutes. The temperature is maintained at 70° C.

The degree of conversion, which is measured on a sample withdrawn at the reactor outlet, is 96% and the intrinsic viscosity, which is measured at 25° C. at 0.1 g/dl in toluene, is 1.28 dl/g. The molecular weight Mn, measured by SEC3D, is 83 000 g/mol.

Finally, at the reactor outlet, 638 micromol per 100 g of monomers of methyltrichlorosilane in solution in cyclohexane are added to the living polymer solution (on an in-line static mixer). After 3 min of this coupling reaction, 580 mmol of water per 100 g of monomers are added to this solution and then the copolymer is subjected to an antioxidizing treatment using 0.8 pce of 2,2'-methylenebis(4-methyl-6-(tert-butyl) phenol) and 0.2 pce of N-(1,3-dimethylbutyl)-N'-phenyl-p-phenylenediamine.

The copolymer thus treated is separated from its solution by a steam stripping operation and is then dried on an open mill at 100° C. for 20 min, in order to obtain the coupled copolymer functionalized with SiOH in the middle of the chain according to the invention.

The intrinsic viscosity of this copolymer E is 1.69 dl/g, the jump in viscosity is 1.32 and its ML viscosity is 55. The molecular weight of the copolymer, determined by the conventional SEC technique, is 137 000 g/mol, the molecular weight Mw is 237 000 g/mol and the PI is 1.73.

The microstructure of this copolymer E is determined by $^{13}$C NMR.

The SBR block of this copolymer E comprises 25% of styrene (by weight) and, for its butadiene part, 59% of vinyl units, 21% of 1,4-cis-units and 20% of 1,4-trans-units.

The level of CH$_3$Si functional groups, determined by $^1$H NMR, for the copolymer E is 5.03 mmol/kg, which corresponds to a level L of 0.42.

The 2D $^1$H-$^{29}$Si NMR analysis exhibits two correlation spots at $\delta_{Si}$=+8 ppm, corresponding to the expected product ((SBR)$_2$SiCH$_3$OH middle of chain form), and at $\delta_{Si}$=−15.4 ppm, corresponding to the coupled geminal product (SBRSiCH$_3$(OH)—O—SiCH$_3$(OH)SBR form). The integration of the peak areas gives a distribution at 94% for the area at $\delta_{Si}$=+8 ppm, and at 6% for the area at $\delta_{Si}$=−15.4 ppm, that is to say this analysis allows it to be concluded that the degree of functionalization L1 is 94%.

The NMR and SEC analyses illustrate the fact that the coupling reaction carried out in the presence of a chelating polar agent is particularly selective.

2) Preparation of a Coupled Copolymer F Having an Si—OH Functional Group in the Middle of the Chain According to the Invention:

Cyclohexane, butadiene, styrene and tetrahydrofurfuryl ethyl ether, according to respective flow rates by weight of 100/11/3.2/0.043, are introduced continuously into a 32.5 l reactor equipped with a stirrer of turbine type. 200 micromol of n-butyllithium (n-BuLi) per 100 g of monomers are introduced at the line inlet in order to neutralize the protic impurities introduced by the various constituents present in the line inlet. 800 µmol of n-BuLi per 100 g of monomers are introduced at the reactor inlet.

The various flow rates are adjusted so that the mean residence time in the reactor is 40 min. The temperature is maintained at 70° C.

The degree of conversion, which is measured on a sample withdrawn at the reactor outlet, is 95% and the intrinsic viscosity, which is measured at 25° C. at 0.1 g/dl in toluene, is 1.61 dl/g. The molecular weight Mn, measured by the SEC3D technique, is 118 000 g/mol.

Finally, at the reactor outlet, 560 micromol per 100 g of monomers of methyltrichlorosilane in solution in cyclohexane are added to the living polymer solution (on an in-line static mixer). After 3 min of this coupling reaction, 400 mmol of water per 100 g of monomers are added to this solution and then the copolymer is subjected to an antioxidizing treatment using 0.8 pce of 2,2'-methylenebis(4-methyl-6-(tert-butyl) phenol) and 0.2 pce of N-(1,3-dimethylbutyl)-N'-phenyl-p-phenylenediamine.

The copolymer thus treated is separated from its solution by a steam stripping operation and is then dried on an open mill at 100° C. for 20 min, in order to obtain the coupled copolymer functionalized with SiOH in the middle of the chain according to the invention.

The intrinsic viscosity of this copolymer F is 2.18 dl/g, the jump in viscosity is 1.35 and its ML viscosity is 81. The molecular weight of the copolymer, determined by the conventional SEC technique, is 185 000 g/mol, the molecular weight Mw is 323 000 g/mol and the PI is 1.75.

The microstructure of this copolymer F is determined by $^{13}$C NMR.

The SBR block of this copolymer F comprises 25% of styrene (by weight) and, for its butadiene part, 58% of vinyl units, 21% of 1,4-cis-units and 21% of 1,4-trans-units.

The level of CH$_3$Si functional groups, determined by $^1$H NMR, for the copolymer F is 4.06 mmol/kg, which corresponds to a level L of 0.48.

The 2D $^1$H-$^{29}$Si NMR analysis exhibits three correlation spots at $\delta_{Si}$=+8 ppm, corresponding to the expected product ((SBR)$_2$SiCH$_3$OH middle of the chain form), at $\delta_{Si}$≈8 ppm, corresponding to the geminal product (SBRSiCH$_3$(OH)$_2$ chain end form), and at $\delta_{Si}$≈0 ppm, corresponding to the star-shaped product ((SBR)$_3$SiCH$_3$ form). The integration of the peak areas gives a distribution of 94% for the area at $\delta_{Si}$=+8 ppm, at 3% for the area at $\delta_{Si}$=−8 ppm and at 3% for the area at $\delta_{Si}$≈0 ppm, that is to say, this analysis allows it to be concluded that the degree of functionalization L1 is 94%.

3) Preparation of a Coupled Copolymer G Having an Si—OH Functional Group in the Middle of the Chain According to the Invention:

Cyclohexane, butadiene, styrene and tetrahydrofurfuryl ethyl ether, according to respective flow rates by weight of 100/11/3.2/0.048, are introduced continuously into a 32.5 l reactor equipped with a stirrer of turbine type. 160 micromol of n-butyllithium (n-BuLi) per 100 g of monomers are introduced at the line inlet in order to neutralize the protic impurities introduced by the various constituents present in the line inlet. 1460 μmol of n-BuLi per 100 g of monomers are introduced at the reactor inlet.

The various flow rates are adjusted so that the mean residence time in the reactor is 40 min. The temperature is maintained at 70° C.

The degree of conversion, which is measured on a sample withdrawn at the reactor outlet, is 97% and the intrinsic viscosity, which is measured at 25° C. at 0.1 g/dl in toluene, is 1.06 dl/g. The molecular weight Mn, determined by the SEC3D technique, is 66 000 g/mol.

Finally, at the reactor outlet, 803 micromol per 100 g of monomers of methyltrichlorosilane in solution in cyclohexane are added to the living polymer solution (on an in-line static mixer). After 3 min of this coupling reaction, 730 mmol of water per 100 g of monomers are added to this solution and then the copolymer is subjected to an antioxidizing treatment using 0.8 pce of 2,2'-methylenebis(4-methyl-6-(tert-butyl)phenol) and 0.2 pce of N-(1,3-dimethylbutyl)-N'-phenyl-p-phenylenediamine.

The copolymer thus treated is separated from its solution by a steam stripping operation and is then dried on an open mill at 100° C. for 20 min, in order to obtain the coupled copolymer functionalized with SiOH in the middle of the chain according to the invention.

The intrinsic viscosity of this copolymer G is 1.40 dl/g, the jump in viscosity is 1.32 and its ML viscosity is 37. The molecular weight of the copolymer, determined by the conventional SEC technique, is 114 000 g/mol, the molecular weight Mw is 190 000 g/mol and the PI is 1.67.

The microstructure of this copolymer G is determined by $^{13}$C NMR.

The SBR block of this copolymer G comprises 25.1% of styrene (by weight) and, for its butadiene part, 58% of vinyl units, 22% of 1,4-cis-units and 20% of 1,4-trans-units.

The level of CH$_3$Si functional groups, determined by $^1$H NMR, for the copolymer G is 6.16 mmol/kg, which corresponds to a level L of 0.40.

The 2D $^1$H-$^{29}$Si NMR analysis exhibits three correlation spots at $\delta_{Si}$=+8 ppm, corresponding to the expected product ((SBR)$_2$SiCH$_3$OH middle of the chain form), at $\delta_{Si}$=−8 ppm, corresponding to the geminal product (SBRSiCH$_3$(OH)$_2$ chain-end form), and at $\delta_{Si}$≈0 ppm, corresponding to the star-shaped product ((SBR)$_3$SiCH$_3$ form). The integration of the peak areas gives a distribution at 92% for the area $\delta_{Si}$=+8 ppm, at 3% for the area at $\delta_{Si}$=−8 ppm and at 5% for the area at $\delta_{Si}$≈0 ppm, that is to say, this analysis allows it to be concluded that the degree of functionalization L1 is 92%.

4) Preparation of a Coupled Copolymer H Having an Si—OH Functional Group in the Middle of the Chain According to the Invention:

Cyclohexane, butadiene, styrene and tetrahydrofurfuryl ethyl ether, according to respective flow rates by weight of 100/9.8/4.4/0.0055, are introduced continuously into a 32.5 l reactor equipped with a stirrer of turbine type. 150 micromol of n-butyllithium (n-BuLi) per 100 g of monomers are introduced at the line inlet in order to neutralize the protic impurities introduced by the various constituents present in the line inlet. 1175 μmol of n-BuLi per 100 g of monomers are introduced at the reactor inlet.

The various flow rates are adjusted so that the mean residence time in the reactor is 40 min. The temperature is maintained at 80° C.

The degree of conversion, which is measured on a sample withdrawn at the reactor outlet, is 89% and the intrinsic viscosity, which is measured at 25° C. at 0.1 g/dl in toluene, is 1.27 dl/g. The molecular weight Mn, determined by the SEC3D technique, is 76 000 g/mol.

Finally, at the reactor outlet, 705 micromol per 100 g of monomers of methyltrichlorosilane in solution in cyclohexane are added to the living polymer solution (on an in-line static mixer). After 3 min of this coupling reaction, 590 mmol of water per 100 g of monomers are added to this solution and then the copolymer is subjected to an antioxidizing treatment using 0.8 pce of 2,2'-methylenebis(4-methyl-6-(tert-butyl)phenol) and 0.2 pce of N-(1,3-dimethylbutyl)-N'-phenyl-p-phenylenediamine.

The copolymer thus treated is separated from its solution by a steam stripping operation and is then dried on an open mill at 100° C. for 20 min, in order to obtain the coupled copolymer functionalized with SiOH in the middle of the chain according to the invention.

The intrinsic viscosity of this copolymer H is 1.68 dl/g, the jump in viscosity is 1.32 and its ML viscosity is 53. The molecular weight of the copolymer, determined by the conventional SEC technique, is 130 000 g/mol, the molecular weight Mw is 208 000 g/mol and the PI is 1.60.

The microstructure of this copolymer H is determined by $^{13}$C NMR.

The SBR block of this copolymer H comprises 28% of styrene (by weight) and, for its butadiene part, 24% of vinyl units, 30% of 1,4-cis-units and 46% of 1,4-trans-units.

The level of CH$_3$Si functional groups, determined by $^1$H NMR, for the copolymer H is 7.63 mmol/kg, which corresponds to a level L of 0.58.

The 2D $^1$H-$^{29}$Si NMR analysis exhibits two correlation spots at $\delta_{Si}$=+8 ppm, corresponding to the expected product ((SBR)$_2$SiCH$_3$OH middle of chain form), and at $\delta_{Si}$=−15.4 ppm, corresponding to the coupled geminal product (SBRSiCH$_3$(OH)—O—SiCH$_3$(OH)SBR form). The integration of the peak areas gives a distribution at 92% for the area at $\delta_{Si}$=+8 ppm, and at 8% for the area at $\delta_{Si}$=−15.4 ppm, that is to say this analysis allows it to be concluded that the degree of functionalization L1 is 92%.

5) Preparation of a "Control" Copolymer I Having an SiOH Functional Group at the Chain End:

Cyclohexane, butadiene, styrene and tetrahydrofurfuryl ethyl ether, according to respective flow rates by weight of 100/11/3.2/0.037, are introduced continuously into a 32.5 l reactor equipped with a stirrer of turbine type. 200 micromol of n-butyllithium (n-BuLi) per 100 g of monomers are introduced at the line inlet in order to neutralize the protic impurities introduced by the various constituents present in the line inlet. 530 μmol of n-BuLi per 100 g of monomers are introduced at the reactor inlet.

The various flow rates are adjusted so that the mean residence time in the reactor is 40 min. The temperature is maintained at 70° C.

The degree of conversion, which is measured on a sample withdrawn at the reactor outlet, is 98%.

Finally, at the reactor outlet, 265 micromol per 100 g of monomers of hexamethylcyclotrisiloxane in solution in cyclohexane are added to the living polymer solution (on an in-line static mixer). The copolymer is then subjected to an antioxidizing treatment using 0.8 pce of 2,2'-methylenebis(4-methyl-6-(tert-butyl)phenol) and 0.2 pce of N-(1,3-dimethylbutyl)-N'-phenyl-p-phenylenediamine.

The copolymer thus treated is separated from its solution by a steam stripping operation and is then dried on an open mill at 100° C. for 20 min, in order to obtain the copolymer functionalized with SiOH at the chain end.

The ML viscosity of this copolymer I is 53. The molecular weight of the copolymer, determined by conventional SEC, is 123 000 g/mol.

The microstructure of this copolymer I is determined by $^{13}$C NMR.

The SBR block of this copolymer I comprises 25% of styrene (by weight) and, for its butadiene part, 58% of vinyl units, 21% of 1,4-cis-units and 21% of 1,4-trans-units.

The 2D $^1$H-$^{29}$Si NMR analysis allows it to be concluded that a chain-end functional group SBR(CH$_3$)$_2$SiOH exists. The level of (CH$_3$)$_2$Si functional groups, determined by $^1$H NMR, for the copolymer I is 5.85 mmol/kg.

6) Preparation of a Nonfunctional "Control" Copolymer J:

In the context of the synthesis of the copolymer J, which is carried out according to the operating conditions described in test 5, except that methanol is added instead of hexamethylcyclotrisiloxane in an MeOH/n-BuLi ratio=1.5.

The ML viscosity of the copolymer J is 53. The molecular weight of the copolymer, determined by conventional SEC, is 123 000 g/mol.

The microstructure of this copolymer J is determined by $^{13}$C NMR.

The SBR block of this copolymer J comprises 25% of styrene (by weight) and, for its butadiene part, 58% of vinyl units, 21% of 1,4-cis-units and 21% of 1,4-trans-units.

7) Preparation of a "Control" Copolymer K Having an SiOH Functional Group at the Chain End:

Cyclohexane, butadiene, styrene and tetrahydrofurfuryl ethyl ether, according to respective flow rates by weight of 100/9.8/4.4/0.0043, are introduced continuously into a 32.5 l reactor equipped with a stirrer of turbine type. 200 micromol of n-butyllithium (n-BuLi) per 100 g of monomers are introduced at the line inlet in order to neutralize the protic impurities introduced by the various constituents present in the line inlet. 610 μmol of n-BuLi per 100 g of monomers are introduced at the reactor inlet.

The various flow rates are adjusted so that the mean residence time in the reactor is 40 min, The temperature is maintained at 80° C.

The degree of conversion, which is measured on a sample withdrawn at the reactor outlet, is 93%.

Finally, at the reactor outlet, 265 micromol per 100 g of monomers of hexamethylcyclotrisiloxane in solution in cyclohexane are added to the living polymer solution (on an in-line static mixer). The copolymer is then subjected to an antioxidizing treatment using 0.8 pce of 2,2'-methylenebis(4-methyl-6-(tert-butyl)phenol) and 0.2 pce of N-(1,3-dimethylbutyl)-N'-phenyl-p-phenylenediamine.

The copolymer thus treated is separated from its solution by a steam stripping operation and is then dried on an open mill at 100° C. for 20 min, in order to obtain the copolymer functionalized with SiOH at the chain end.

The ML viscosity of the copolymer K is 54. The molecular weight of the copolymer, determined by conventional SEC, is 119 000 g/mol.

The microstructure of this copolymer K is determined by $^{13}$C NMR.

The SBR block of this copolymer K comprises 27% of styrene (by weight) and, for its butadiene part, 24% of vinyl units, 30% of 1,4-cis-units and 46% of 1,4-trans-units.

The 2D $^1$H-$^{29}$Si NMR analysis allows it to be concluded that a chain-end functional group (CH$_3$)$_2$SiOH exists. The level of (CH$_3$)$_2$Si functional groups, determined by $^1$H NMR, for the copolymer K is 6.0 mmol/kg.

8) Preparation of a Nonfunctional "Control" Copolymer L:

In the context of the synthesis of the copolymer L, which is carried out according to the operating conditions described in test 7, except that methanol is added instead of hexamethylcyclotrisiloxane in an MeOH/n-BuLi ratio=1.5.

The ML viscosity is 54. The molecular weight of the copolymer, determined by conventional SEC, is 120 000 g/mol.

The microstructure of this copolymer L is determined by $^{13}$C NMR.

The SBR block of this copolymer L comprises 27% of styrene (by weight) and, for its butadiene part, 24% of vinyl units, 30% of 1,4-cis-units and 46% of 1,4-trans-units.

---

Example 3:

Compositions comprising either an elastomer having a silanol functional group in the middle of the chain according to the invention or an elastomer not in accordance with the invention

---

In this example, the four elastomers SBR A, SBR B, SBR C and SBR D with a Tg=−38° C. prepared in Example 1 were used for the preparation of rubber compositions A, B, C and D of tread type each comprising silica as reinforcing inorganic filler.

Each of these compositions A, B, C or D exhibits the following formulation (expressed in pce: parts per hundred parts of elastomer):

| | |
|---|---|
| Elastomer | 100 |
| Silica (1) | 80 |
| N234 | 1 |
| Aromatic oil ("Enerflex 65") (5) | 39.5 |
| Bonding agent (2) | 6.4 |
| ZnO | 2.5 |
| Stearic acid | 2 |
| Antioxidant (3) | 1.9 |
| Antiozone wax "C32ST" (6) | 1.5 |
| Diphenylguanidine | 1.5 |

-continued

| | |
|---|---|
| Sulphur | 1.2 |
| Sulphenamide (4) | 2 | with:
(1) = Silica "Zeosil 1165 MP" from Rhodia,
(2) = Bonding agent "Si69" from Degussa,
(3) = N-(1,3-dimethylbutyl)-N'-phenyl-p-phenylenediamine,
(4) = N-cyclohexyl-2-benzothiazylsulphenamide,
(5) = Aromatic oil from Hansen & Rosenthal European,
(6) = Antiozone wax from Repsol.

Each of the following compositions is prepared, in a first step of thermomechanical working, by two stages separated by a cooling phase and then, in a second finishing step, by mechanical working.

The elastomer, two thirds of the reinforcing filler, the coupling agent and the diphenylguanidine, then, approximately one minute later, the remainder of the reinforcing filler, the aromatic oil, the stearic acid and the antiozone wax "C32ST" are successively introduced into a laboratory internal mixer of "Banbury" type, the capacity of which is 400 cm$^3$, which is 70% filled and which has a starting temperature of approximately 90° C.

The first stage of thermomechanical working is carried out for 4 to 5 minutes up to a maximum dropping temperature of approximately 160° C. The elastomer block is then recovered and cooled.

A second stage of thermomechanical working is then carried out in the same mixer for a time of 3 to 4 minutes, with the addition of the zinc monoxide and the antioxidant, up to a maximum dropping temperature of approximately 160° C.

The first abovementioned step of thermomechanical working is thus carried out, it being specified that the mean speed of the blades during this first step is 45 rev/min.

The mixture thus obtained is recovered and cooled and then, in an external mixer (homofinisher), the sulphur and the sulphenamide are added at 30° C., the combined mixture being further mixed for a time of 3 to 4 minutes (second abovementioned step of mechanical working).

The compositions thus obtained are subsequently calendered, either in the form of sheets (with a thickness ranging from 2 to 3 mm) or fine sheets of rubber, for the measurement of their physical or mechanical properties, or in the form of profiled elements which can be used directly, after cutting and/or assembly to the desired dimensions, for example as tyre semi-finished products, in particular for treads.

Crosslinking is carried out at 150° C. for 40 min.
The results are recorded in Table 1 below.

TABLE 1

| | Composition | | | |
|---|---|---|---|---|
| | A | B | C | D |
| Elastomer | SBR A | SBR B | SBR C | SBR D |
| ML (1 + 4) at 100° C. (rubber) | 41 | 60 | 39 | 39 |
| Properties in the noncrosslinked state | | | | |
| ML (1 + 4) at 100° C. ("Mooney mixture") | 47 | 49 | 73 | 44 |
| Properties in the crosslinked state | | | | |
| Shore A | 58.3 | 59.4 | 56.6 | 66.9 |
| EM10 | 3.72 | 4.17 | 3.48 | 5.92 |
| EM100 | 1.57 | 1.71 | 1.57 | 1.73 |
| EM300 | 2.08 | 1.97 | 2.11 | 1.84 |
| EM300/EM100 | 1.33 | 1.15 | 1.35 | 1.06 |

TABLE 1-continued

| | Composition | | | |
|---|---|---|---|---|
| | A | B | C | D |
| Scott fracture index at 20° C. | | | | |
| Fr (MPa) | 21.21 | 18.03 | 24.94 | 20.90 |
| Eb (%) | 520 | 535 | 577 | 597 |
| Losses 60° C. (%) | 25.9 | 34.7 | 19.4 | 31.6 |
| Dynamic properties as a function of the strain | | | | |
| Delta G* (MPa) at 23° C. | 1.12 | 1.16 | 0.88 | 5.39 |
| Tan (δ) max at 23° C. | 0.231 | 0.267 | 0.210 | 0.346 |

It should be noted that composition A according to the invention exhibits a Mooney "mixture" value which is comparable to that of composition D based on a nonfunctional elastomer. Composition A according to the invention exhibits a Mooney "mixture" value which is markedly lower than that of composition C based on an elastomer which comprises an SiOH functional group at the chain end. The functional elastomer according to the invention makes it possible to improve the processing with respect to the elastomer having an SiOH functional group at the chain end.

As regards the properties in the crosslinked state, it should be noted that the EM300/EM100 ratio of composition A according to the invention is equivalent to that of composition C based on an elastomer which comprises an SiOH functional group at the chain end. Composition A according to the invention exhibits an EM300/EM100 ratio which is markedly greater than that of composition D based on a nonfunctional elastomer. The functional elastomer according to the invention makes it possible to improve the reinforcing with respect to the nonfunctional elastomer.

It should be noted that composition B exhibits an EM300/EM100 ratio which is lower than that of composition A according to the invention. This result clearly demonstrates that the reinforcing is markedly improved solely for the composition according to the invention.

As regards the dynamic properties, it should be noted that the hysteresis properties (at low and high strains) of composition A according to the invention are similar to those of composition C based on an elastomer which comprises an SiOH functional group at the chain end. Composition A according to the invention exhibits hysteresis properties (at low and high strains) which are markedly improved with respect to those of composition D based on a nonfunctional elastomer. The functional elastomer according to the invention makes it possible to improve the hysteresis properties (at low and high strains) with respect to the nonfunctional elastomer. Thus, the functional elastomer according to the invention confers, on composition A, an advantageous compromise in properties in the noncrosslinked state (processing properties) and in the crosslinked state (hysteresis properties).

It should be noted that composition B exhibits hysteresis properties (at low and high strains) which have deteriorated with respect to those of composition A according to the invention. This result clearly demonstrates that the hysteresis properties (at low and high strains) are better solely for the composition according to the invention.

In other words, composition A according to the invention based on an elastomer which comprises an SiOH functional group in the middle of the chain, for which the proportion of Si occurring in the form of an SiOH functional group in the middle of the chain is 100%, exhibits rubber properties in the crosslinked state which are improved with respect to those of composition D based on a nonfunctional elastomer as a result of a reduced hysteresis and with respect to composition C based on an elastomer comprising an SiOH functional group at the chain end as a result of an improved ability to be processed.

Composition A according to the invention based on an elastomer which comprises an SiOH functional group in the middle of the chain, for which the proportion of Si occurring in the form of an SiOH functional group in the middle of the chain is 100%, exhibits rubber properties in the crosslinked state which are improved with respect to those of composition B, for which the proportion of Si occurring in the form of an SiOH functional group in the middle of the chain is 47%, as a result of a reduced hysteresis at low and high strains and as a result of an improved reinforcing.

---

Example 4:

Compositions comprising either an elastomer having a silanol functional group in the middle of the chain according to the invention or an elastomer not in accordance with the invention

---

In this example, the three elastomers SBR E, SBR I and SBR J with a Tg=−25° C. prepared according to Example 2 were used for the preparation of rubber compositions E, I and J of tread type each comprising silica as reinforcing inorganic filler.

Each of these compositions E, I and J exhibits the following formulation (expressed in pce: parts per one hundred parts of elastomer):

---

| Elastomer | 100 |
| Silica (1) | 80 |
| N234 | 1 |
| MES oil (7) | 15 |
| Resin (5) | 15 |
| Bonding agent (2) | 6.4 |
| ZnO | 2.5 |
| Stearic acid | 2 |
| Antioxidant (3) | 1.9 |
| Antiozone wax "C32ST" (6) | 1.5 |
| Diphenylguanidine | 1.5 |
| Sulphur | 1.2 |
| Sulphenamide (4) | 2 | with:
(1) = Silica "Zeosil 1165 MP" from Rhodia,
(2) = Bonding agent "Si69" from Degussa,
(3) = N-(1,3-dimethylbutyl)-N'-phenyl-p-phenylenediamine,
(4) = N-cyclohexyl-2-benzothiazylsulphenamide,
(5) = Resin Dercolyte L120 from DRT or Sylvagum TR7125C from Arizona,
(6) = Antiozone wax from Repsol,
(7) = Catenex ® SNR from Shell.

Each of the following compositions is prepared, in a first step of thermomechanical working, by two stages separated by a cooling phase and then, in a second finishing step, by mechanical working.

The elastomer, two thirds of the reinforcing filler, the coupling agent and the diphenylguanidine, then, approximately one minute later, the remainder of the reinforcing filler, the oil, the resin, the stearic acid and the antiozone wax "C32ST" are successively introduced into a laboratory internal mixer of "Banbury" type, the capacity of which is 400 cm$^3$, which is 70% filled and which has a starting temperature of approximately 90° C.

The first stage of thermomechanical working is carried out for 4 to 5 minutes up to a maximum dropping temperature of approximately 160° C. The elastomer block is then recovered and cooled.

A second stage of thermomechanical working is then carried out in the same mixer for a time of 3 to 4 minutes, with the addition of the zinc monoxide and the antioxidant, up to a maximum dropping temperature of approximately 160° C.

The first abovementioned step of thermomechanical working is thus carried out, it being specified that the mean speed of the blades during this first step is 45 rev/min.

The mixture thus obtained is recovered and cooled and then, in an external mixer (homofinisher), the sulphur and the sulphenamide are added at 30° C., the combined mixture being further mixed for a time of 3 to 4 minutes (second abovementioned step of mechanical working).

The compositions thus obtained are subsequently calendered, either in the form of sheets (with a thickness ranging from 2 to 3 mm) or fine sheets of rubber, for the measurement of their physical or mechanical properties, or in the form of profiled elements which can be used directly, after cutting and/or assembly to the desired dimensions, for example as tyre semi-finished products, in particular for treads.

Crosslinking is carried out at 150° C. for 40 min.

The results are recorded in Table 2 below.

TABLE 2

| | Composition | | |
|---|---|---|---|
| | E | I | J |
| Elastomer | SBR E | SBR I | SBR J |
| ML (1 + 4) at 100° C. (rubber) | 55 | 53 | 53 |
| Properties in the noncrosslinked state | | | |
| ML (1 + 4) at 100° C. ("Mooney mixture") | 69 | 98 | 67 |
| Properties in the crosslinked state | | | |
| Shore A | 61.1 | 61.3 | 59.9 |
| EM10 | 4.29 | 4.49 | 4.40 |
| EM100 | 1.91 | 1.87 | 1.72 |
| EM300 | 2.51 | 2.59 | 1.91 |
| EM300/EM100 | 1.31 | 1.39 | 1.11 |
| Scott fracture index at 20° C. | | | |
| Fr (MPa) | 17.83 | 17.69 | 18.13 |
| Eb (%) | 411 | 399 | 445 |
| Losses 60° C. (%) | 27.7 | 25.0 | 29.6 |
| Dynamic properties as a function of the strain | | | |
| Delta G* (MPa) at 40° C. | 0.85 | 0.74 | 1.08 |
| Tan (δ) max at 40° C. | 0.221 | 0.201 | 0.231 |

It should be noted that composition E according to the invention exhibits a Mooney "mixture" value which is comparable to that of composition J based on a nonfunctional elastomer. Composition E according to the invention exhibits a Mooney "mixture" value which is markedly lower than that of composition I based on an elastomer which comprises an SiOH functional group at the chain end. The functional elastomer according to the invention makes it possible to improve the processing with respect to the elastomer having an SiOH functional group at the chain end.

As regards the properties in the crosslinked state, it should be noted that the EM300/EM100 ratio of composition E according to the invention is similar to that of composition I based on an elastomer which comprises an SiOH functional group at the chain end. Composition E according to the invention exhibits an EM300/EM100 ratio which is markedly greater than that of composition J based on a nonfunctional elastomer. The functional elastomer according to the invention makes it possible to improve the reinforcing with respect to the nonfunctional elastomer.

As regards the dynamic properties, it should be noted that the hysteresis properties (at low and high strains) of composition E according to the invention are similar to those of composition I based on an elastomer which comprises an SiOH functional group at the chain end. Composition E according to the invention exhibits hysteresis properties (at low and high strains) which are improved with respect to those of composition J based on a nonfunctional elastomer. The functional elastomer according to the invention makes it possible to improve the hysteresis properties (at low and high strains) with respect to the nonfunctional elastomer.

In other words, composition E according to the invention based on an elastomer which comprises an SiOH functional group in the middle of the chain, for which the proportion of Si occurring in the form of an SiOH functional group in the middle of the chain is 94%, exhibits rubber properties in the crosslinked state which are improved with respect to those of composition J based on a nonfunctional elastomer as a result of a reduced hysteresis, on the one hand, and with respect to composition I based on an elastomer comprising an SiOH functional group at the chain end as a result of an improved ability to be processed, on the other hand.

---

Example 5:

Compositions comprising either an elastomer having a silanol functional group in the middle of the chain according to the invention or an elastomer not in accordance with the invention

---

In this example, the three elastomers SBR H, SBR K and SBR L with a Tg=−48° C. prepared according to Example 2 were used for the preparation of rubber compositions H, K and L of tread type each comprising silica as reinforcing inorganic filler.

Each of these compositions H, K and L exhibits the following formulation (expressed in pce: parts per hundred parts of elastomer):

| | |
|---|---|
| Elastomer | 100 |
| Silica (1) | 50 |
| N234 | 1 |
| Bonding agent (2) | 4 |
| ZnO | 3 |
| Stearic acid | 1.9 |
| Antioxidant (3) | 1.9 |
| Diphenylguanidine | 1 |
| Sulphur | 1.5 |
| Sulphenamide (4) | 1.8 | with:
(1) = Silica "Zeosil 1165 MP" from Rhodia,
(2) = Bonding agent "Si69" from Degussa,
(3) = N-(1,3-dimethylbutyl)-N'-phenyl-p-phenylenediamine,
(4) = N-cyclohexyl-2-benzothiazylsulphenamide.

Each of the following compositions is prepared, in a first step of thermomechanical working, by a kneading stage and then, in a second finishing step, by mechanical working.

The elastomer, the reinforcing filler, the coupling agent and the diphenylguanidine, then, approximately one minute later, the stearic acid, the antioxidant and the zinc monoxide are successively introduced into a laboratory internal mixer of "Banbury" type, the capacity of which is 400 cm³, which is 70% filled and which has a starting temperature of approximately 70° C.

The first stage of thermomechanical working is carried out for 4 to 5 minutes up to a maximum dropping temperature of approximately 160° C. The elastomer block is then recovered and cooled.

The first abovementioned step of thermomechanical working is thus carried out, it being specified that the mean speed of the blades during this first step is 45 rev/min.

The mixture thus obtained is recovered and cooled and then, in an external mixer (homofinisher), the sulphur and the sulphenamide are added at 30° C., the combined mixture being further mixed for a time of 3 to 4 minutes (second abovementioned step of mechanical working).

The compositions thus obtained are subsequently calendered, either in the form of sheets (with a thickness ranging from 2 to 3 mm) or fine sheets of rubber, for the measurement of their physical or mechanical properties, or in the form of profiled elements which can be used directly, after cutting and/or assembly to the desired dimensions, for example as tyre semi-finished products, in particular for treads.

Crosslinking is carried out at 150° C. for 40 min.

The results are recorded in Table 3 below.

TABLE 3

| | Composition | | |
|---|---|---|---|
| | H | K | L |
| Elastomer | SBR H | SBR K | SBR L |
| ML (1 + 4) at 100° C. (rubber) | 53 | 54 | 54 |
| Properties in the noncrosslinked state | | | |
| ML (1 + 4) at 100° C. ("Mooney mixture") | 57 | 74 | 52 |
| Properties in the crosslinked state | | | |
| Shore A | 66.0 | 67.1 | 70.5 |
| EM10 | 5.70 | 5.94 | 6.85 |
| EM100 | 2.55 | 2.64 | 2.59 |
| EM300 | 2.94 | 3.00 | 2.70 |
| EM300/EM100 | 1.15 | 1.14 | 1.05 |
| Scott fracture index at 20° C. | | | |
| Fr (MPa) | 19.80 | 15.92 | 20.27 |
| Eb (%) | 351 | 308 | 391 |
| Losses 60° C. (%) | 14.8 | 12.6 | 21.6 |
| Dynamic properties as a function of the strain | | | |
| Delta G* (MPa) at 23° C. | 0.76 | 0.66 | 2.44 |
| Tan (δ) max at 23° C. | 0.129 | 0.109 | 0.186 |

It should be noted that composition H according to the invention exhibits a Mooney "mixture" value which is comparable to that of composition L based on a nonfunctional elastomer. Composition H according to the invention exhibits a Mooney "mixture" value which is markedly lower than that of composition K based on an elastomer which comprises an SiOH functional group at the chain end. The functional elastomer according to the invention makes it possible to improve the processing with respect to the elastomer having an SiOH functional group at the chain end.

As regards the properties in the crosslinked state, it should be noted that the EM300/EM100 ratio of composition H according to the invention is equivalent to that of composition K based on an elastomer which comprises an SiOH functional group at the chain end. Composition H according to the invention exhibits an EM300/EM100 ratio which is markedly greater than that of composition L based on a nonfunctional elastomer. The functional elastomer according to the invention makes it possible to improve the reinforcing with respect to the nonfunctional elastomer.

As regards the dynamic properties, it should be noted that the hysteresis properties (at low and high strains) of composition H according to the invention are similar to those of composition K based on an elastomer which comprises an SiOH functional group at the chain end. Composition H according to the invention exhibits hysteresis properties (at low and high strains) which are markedly improved with respect to those of composition L based on a nonfunctional elastomer. The functional elastomer according to the invention makes it possible to improve the hysteresis properties (at low and high strains) with respect to the nonfunctional elastomer.

In other words, composition H according to the invention based on an elastomer which comprises an SiOH functional group in the middle of the chain, for which the proportion of Si occurring in the form of an SiOH functional group in the middle of the chain is 92%, exhibits rubber properties which are improved in the crosslinked state with respect to those of composition L based on a nonfunctional elastomer as a result of a reduced hysteresis, on the one hand, and in the non-crosslinked state with respect to composition K based on an elastomer comprising an SiOH functional group at the chain end as a result of an improved ability to be processed, on the other hand.

Measurements and Tests Used—Experimental Techniques Used for the Precuring Characterization of the Polymers Obtained:

(a) Determination of the distribution in molar masses by the steric exclusion chromatography technique (conventional SEC)

The SEC (size exclusion chromatography) technique was used to determine the distributions in molecular masses relative to samples of these polymers. This technique has made it possible, starting from standard products having the characteristics described in Example 1 of the document of European Patent EP-A-692 493, to evaluate, for a sample, a number-average molecular weight (Mn) which has a relative value, unlike that determined by osmometry, and also a weight-average molecular weight (Mw). The polydispersity index (PI=Mw/Mn) of this sample, calculated via a "Moore" calibration, was deduced therefrom.

According to this technique, the macromolecules are separated physically, according to their respective sizes in the swollen state, in columns filled with a porous stationary phase. Before carrying out this separation, the sample of polymer is dissolved in tetrahydrofuran at a concentration of approximately 1 g/l. The solution is then filtered through a filter with a porosity of 0.45 μm before injection.

A chromatograph sold under the name "Waters Alliance 2690", equipped with an in-line degasser, is used for the abovementioned separation. The elution solvent is tetrahydrofuran, the flow rate is 1 ml/min, the temperature of the system is 35° C. and the analysis time is 30 min. Use is made of a set of two "Waters" columns, "Styragel HT6E" type, arranged in series.

The injected volume of the polymer sample solution is 100 μl. The detector is a "Waters" model "2410" differential refractometer. Use is also made of systems software for the chromatographic data having the trade name "Waters Empower".

The calculated average molar masses are relative to a calibration curve produced for SBRs with the following microstructure: 25% by weight of units of styrene type, 23% by weight of units of 1,2-type and 50% by weight of units of 1,4-trans-type.

(b) Determination of the distribution in molar masses by the triple detection steric exclusion chromatography technique (SEC3D)

The SEC (size exclusion chromatography) technique was used to determine the distributions in molecular weights relative to samples of these polymers.

Principle of the Measurement:

This technique makes it possible to separate the macromolecules in solution according to their size through columns filled with a porous gel. The macromolecules are separated according to their hydrodynamic volume, the bulkiest being eluted first.

In combination with three detectors (3D), a refractometer, a viscometer and a 90° light scattering detector, SEC makes it possible to understand the distribution of absolute molar masses of a polymer. The various number-average absolute molar masses (Mn) and weight-average absolute molar masses (Mw) can also be calculated. The polydispersity index (PI=Mw/Mn) of the sample is deduced therefrom.

According to this technique, the macromolecules are separated physically, according to their respective sizes in the swollen state, in columns filled with a porous stationary phase. Before carrying out this separation, the sample of polymer is dissolved in tetrahydrofuran at a concentration of approximately 1 g/l. The solution is then filtered through a filter with a porosity of 0.45 μm before injection.

SEC3D Analysis:

The device used is a "Waters Alliance" chromatograph, The elution solvent is tetrahydrofuran, the flow rate is 0.5 ml/min and the temperature of the system is 35° C. Use is made of a set of four Polymer Laboratories columns in series, with the trade names: two "Mixed A LS" and two "Mixed B LS", The injected volume of the polymer sample solution is 100 μl, The detection system used is the "TDA 302" from Viscotek; it is composed of a differential refractometer, of a differential viscometer and of a 90° light scattering detector. For these three detectors, the wavelength is 670 nm. For the calculation of the average molar masses, the value of the increment of refractive index dn/dC of the polymer solution, which value is defined beforehand in tetrahydrofuran at 35° C. and 670 nm, is integrated. The systems software for the data is the "Omnisec" system from Viscotek.

| Number | Brand | Range of molar masses (g/mol) | Length (mm) | Internal diameter (mm) | Size of the particles (μm) | Trade name | References (by way of indication) |
|---|---|---|---|---|---|---|---|
| Column 1 | Waters | $2000-10^7$ | 300 | 7.8 | 10 | Styragel HT6E | WAT044219 |
| Column 2 | Waters | $2000-10^7$ | 300 | 7.8 | 10 | Styragel HT6E | WAT044219 |

(c) For the polymers and rubber compositions, the Mooney viscosities ML (1+4) at 100° C. are measured according to Standard ASTM D-1646.

Use is made of an oscillating consistometer as described in Standard ASTM D-1646. The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 N.m).

(d) The glass transition temperatures Tg of the polymers are measured using a differential scanning calorimeter.

(e) The $CH_3Si(SBR)_2OH$ functionalization in the middle of the chain or the $SBR(CH_3)_2SiOH$ functionalization at the chain end is characterized by 2D $^1H$-$^{29}Si$ NMR and quantified by $^1H$ NMR.

The 2D $^1H$-$^{29}Si$ NMR spectrum makes it possible to confirm the nature of the functional group by virtue of the chemical shift values of the silicon nuclei and of the protons in the $^2J$ vicinity (via two bonds), It uses a $^2J_{1H-29Si}$ coupling constant value of 8 Hz. The chemical shift of the silicon of the product $CH_3Si(SBR)_2OH$ in the middle of the chain is approximately 8 ppm and that of the form $SBR(CH_3)_2SiOH$ at the chain end is approximately 11-12 ppm.

The $^1H$ NMR spectrum makes it possible to quantify the functional group by integration of the signal characteristic of the protons of the methyl group carried by the silicon $CH_3Si$, situated in the vicinity of $\delta$=0 ppm. The samples are dissolved in carbon disulphide ($CS_2$). 100 μL of deuterated cyclohexane ($C_6D_{12}$) are added for the lock signal. The NMR analyses are carried out on a 500 MHz Bruker spectrometer equipped with a 5 mm "broad band" BBI probe. For the quantitative $^1H$ NMR experiment, the sequence uses a 30° pulse and a repetition time of 2 seconds.

(f) The $^{13}C$ NMR technique[1] is used to determine the microstructure of the elastomers obtained. The $^{13}C$ NMR analyses are carried out on a 250 MHz Bruker spectrometer equipped with a 10 mm $^{13}C$-$^1H$ dual probe. The elastomer is dissolved in $CDCl_3$ at a concentration of approximately 75 g/l. The quantitative $^{13}C$ NMR experiment uses a sequence with $^1H$ decoupling and suppression of the Overhauser effect (inverse gated $^1H$-decoupling), a 90° pulse and a repetition time=6 s. The spectral width of 200 ppm and the number of scans is 8192. The spectra are calibrated on the central peak of the triplet of $CDCl_3$ at 77 ppm.

[1] Ref 1: Beebe, D. H.; *Polymer*, 1978, 19, 231-33. Ref 2: Bradbury, J. H., Elix, J. A. and Perera, M. C. S.; *Journal of Polymer Science*, 1988, 26, 615-26. Ref 3: Durbetaki, A. J. and Miles, C. M.; *Analytical Chemistry*, 1965, 37, 1231-35. Ref 4: Gronski, W., Murayama, N. and Cantow, H.-J.; *Polymer*, 1976, April, 358-60, Ref 5: Kobayashi, E., Furakawa, J., Ochiai, M. and Tsujimoto, T.; *European Polymer J.*, 1983, 10, 871-75.

(g) For the polymers, the intrinsic viscosity at 25° C. of a 0.1 g/dl solution of polymer in toluene is measured starting from a solution of dry polymer:

Principle:

The intrinsic viscosity is determined by the measurement of the flow time t of the polymer solution and of the flow time $t_o$ of the toluene in a capillary tube.

The flow time of the toluene and the flow time of the 0.1 g/dl polymer solution are measured in a Ubbelohde tube (diameter of the capillary 0.46 mm, capacity from 18 to 22 ml) placed in a bath thermostatically controlled at 25±0.1° C.

The intrinsic viscosity is obtained by the following relationship:

$$\eta_{int} = \frac{1}{C}\ln\left[\frac{(t)}{(t_O)}\right]$$

with:
C: concentration of the toluene solution of polymer in g/dl;
t: flow time of the toluene solution of polymer in seconds;
$t_o$: flow time of the toluene in seconds;
$\eta_{int}$: intrinsic viscosity, expressed in dl/g.

(h) Tensile tests:

These tests make it possible to determine the elasticity stresses and the properties at break. Unless otherwise indicated, they are carried out in accordance with French Standard NF T 46-002 of September 1988. The nominal secant moduli (or apparent stresses, in MPa) are measured in second elongation (i.e., after a cycle of accommodation to the degree of extension anticipated for the measurement itself) at 10% elongation (recorded as EM10), 100% elongation (recorded as EM100) and 300% elongation (recorded as EM300). The breaking stresses (in MPa) and the elongations at break (in %) are also measured. All these tensile measurements are carried out under standard conditions of temperature (23±2° C.) and humidity (50±5% relative humidity), according to French Standard NF T 40-101 (December 1979).

(i) Shore A hardness:

The Shore A hardness of the compositions after curing is assessed in accordance with Standard ASTM D 2240-86.

(j) Dynamic properties:

The dynamic properties $\Delta G^*$max and $\tan(\delta)_{max}$ are measured on a viscosity analyser (Metravib VA4000) according to Standard ASTM D 5992-96. The response of a sample of vulcanized composition (cylindrical test specimen with a thickness of 4 mm and a cross section of 400 mm$^2$) subjected to a simple alternating sinusoidal shear stress at a frequency of 10 Hz is recorded under standard temperature conditions (23° C. or 40° C.) according to Standard ASTM D 1349-99. A strain amplitude sweep is carried out from 0.1% to 50% (outward cycle) and then from 50% to 1% (return cycle). The results made use of are the complex dynamic shear modulus ($G^*$), the complex dynamic shear modulus G", expressed by the measurement of the maximum of G", recorded as G" max 23° C., at an amplitude from 0.1% to 50% and at a strain amplitude of 50%, and the loss factor $\tan(\delta)$. The maximum value of $\tan(\delta)$ observed, recorded as $\tan(\delta)_{max}$, and the difference in complex modulus ($\Delta G^*$) between the values at 0.15% and 50% strain (Payne effect) are shown for the return cycle.

(k) Measurements of the hysteresis properties:

The hysteresis properties can be evaluated by the measurement of the losses in energy by rebound of the samples having energy applied, measured at the 6th impact, under standard temperature conditions (23° C.) or at higher temperatures (60° C.) and expressed in % according to the following relationship:

HP (%)=100 [(W0−W1)/W0] with W0: energy supplied; W1: energy restored.

The invention claimed is:

1. Coupled diene elastomer having a silanol functional group, wherein it comprises a silanol functional group in the middle of the chain, an overall level of Si functional group L (which is the ratio $N_s/N_p$, in which $N_s$ represents the number of moles of silicon bonded to the coupled polymer, determined by $^1H$ nuclear magnetic resonance NMR and expressed in mmol/kg, and $N_p$ represents the number of mmoles of polymer before coupling per kilogram of polymer) ranging from 0.36 to 0.60, a level of silanol functional group (SiOH) in the middle of the chain L1, which is the ratio corresponding to the number of moles of SiOH functional groups to the number of moles of silicon (Si), determined by 2D $^1$H-$^{29}$Si nuclear magnetic resonance NMR, ranging from 80 to 100% and a monomodal distribution of the number-average molecular weights of the coupled polymer chains.

2. Process for obtaining a monomodal coupled diene elastomer having a silanol functional group in the middle of the chain according to claim 1, wherein the said process consists, in a first stage, in reacting the monomer(s) optionally in the presence or absence of an inert hydrocarbon solvent, with a polymerization initiator in the presence of a chelating polar agent having at least one nonbonding doublet on at least two atoms and, in a second stage, in reacting the living diene polymer with a coupling agent for polymer chains in the presence of an inert hydrocarbon solvent in order to obtain, after hydrolysis, the monomodal coupled diene polymer having a silanol functional group in the middle of the chain.

3. Process according to claim 2, wherein the chelating polar agent is chosen from the group consisting of agents comprising at least one tertiary amine functional group or at least one ether functional group.

4. Process according to claim 3, wherein the chelating polar agent is chosen from the group consisting of tetrahydrofurfuryl ethyl ether and tetramethylethylenediamine.

5. Process according to claim 2 the coupling agent for polymer chains corresponds to the formula $RSiX_3$ in which R represents a primary or secondary alkyl, cycloalkyl or aryl group having from 1 to 20 carbon atoms and X represents a halogen atom, preferably chlorine or bromine.

6. Process according to claim 2 the coupling agent/metal of the initiator of the living polymer chains quantitative ratio is between 0.4 and 1.0.

7. Process according to claim 6, wherein the coupling agent/metal of the initiator of the living polymer chains quantitative ratio is between 0.5 and 0.7.

8. Process according to claim 2, wherein the polymerization solvent is the same as the coupling solvent for the polymer chains.

9. Process for obtaining a monomodal coupled diene elastomer having a silanol functional group in the middle of the chain according to claim 2, wherein the said elastomer is:
  a homopolymer obtained by solution polymerization of a conjugated diene monomer having from 4 to 12 carbon atoms, such as a polybutadiene or a polyisoprene, or
  a copolymer obtained by solution copolymerization of one or more conjugated dienes with one another and/or with one or more vinylaromatic compounds having from 8 to 20 carbon atoms, such as a butadiene/vinylaromatic or butadiene/vinylaromatic/isoprene copolymer.

10. Monomodal coupled diene elastomer having a silanol functional group in the middle of the chain 20 capable of being obtained by a process according to claim 2.

11. Crosslinkable or crosslinked rubber composition which can be used to form a tyre tread, based on at least one reinforcing inorganic filler and at least one monomodal coupled diene elastomer having a silanol functional group in the middle of the chain according to claim 1.

12. Composition according to claim 11, wherein the said monomodal coupled diene elastomer having a silanol functional group in the middle of the chain results:
  from a homopolymer obtained by solution polymerization of a conjugated diene monomer having from 4 to 12 carbon atoms, such as a polybutadiene or a polyisoprene, or
  from a copolymer obtained by solution copolymerization of one or more conjugated dienes with one another and/ or with one or more vinylaromatic compounds having from 8 to 20 carbon atoms, such as a butadiene/vinylaromatic or butadiene/vinylaromatic/isoprene copolymer.

13. Composition according to claim 12, wherein the said monomodal coupled diene elastomer having a silanol functional group in the middle of the chain results from a butadiene/vinylaromatic copolymer prepared in solution.

14. Rubber composition according to claim 11, wherein the said monomodal coupled diene elastomer having a silanol functional group in the middle of the chain exhibits a number-average molecular weight Mn which is between 100 000 g/mol and 350 000 g/mol and preferably between 114 000 g/mol and 185 000 g/mol.

15. Rubber composition according to claim 11, wherein it is based on an elastomer matrix predominantly comprising the said monomodal coupled diene elastomer having a silanol functional group in the middle of the chain.

16. Rubber composition according to claim 11, wherein it comprises an elastomer matrix composed of the said monomodal coupled diene elastomer having a silanol functional group in the middle of the chain.

17. Rubber composition according to claim 11, the said composition comprising a reinforcing filler comprising the said reinforcing inorganic filler, wherein the said reinforcing inorganic filler is present in the said reinforcing filler according to a fraction by weight of greater than 50% and ranging up to 100%.

18. Rubber composition according to claim 17, wherein the reinforcing inorganic filler is silica.

19. Process for preparing a crosslinkable composition according to claim 11, wherein it comprises:
  (i) the preparation of a monomodal coupled diene elastomer having a silanol functional group in the middle of the chain capable of being obtained by a process in a first stage, in reacting the monomer(s) optionally in the presence or absence of an inert hydrocarbon solvent, with a polymerization initiator in the presence of a chelating polar agent having at least one nonbonding doublet on at least two atoms and, in a second stage, in reacting the living diene polymer with a coupling agent for polymer chains in the presence of an inert hydrocarbon solvent in order to obtain, after hydrolysis, the monomodal coupled diene polymer having a silanol functional group in the middle of the chain;
  (ii) carrying out, at a maximum temperature of between 130° C. and 200° C., a first step of thermomechanical working of the constituents of the said composition comprising the said elastomer having a silanol functional group in the middle of the chain and a reinforcing inorganic filler, with the exception of a crosslinking system, then
  (iii) carrying out, at a temperature lower than the said maximum temperature of the said first step, a second step of mechanical working during which the said crosslinking system is incorporated.

20. Tyre tread, characterized in that it comprises a crosslinkable or crosslinked rubber composition according to claim 11.

21. Tyre tread according to claim 20, wherein it is composed of the said crosslinkable or crosslinked rubber composition.

22. Tyre exhibiting a reduced rolling resistance, wherein it comprises a tread according to claim 20.

* * * * *

UNITED STATES PATENT AND TRADEMARK OFFICE
CERTIFICATE OF CORRECTION

PATENT NO. : 8,344,063 B2  
APPLICATION NO. : 12/596582  
DATED : January 1, 2013  
INVENTOR(S) : Jean-Marc Marechal et al.

Page 1 of 1

It is certified that error appears in the above-identified patent and that said Letters Patent is hereby corrected as shown below:

Title Page;

Section (73) Assignees: please change "Michelin Recherche Et Technique S.A., Granges-Paccot (CH); Compahnie Gererale des Establissements Michelin, Clermont-Ferrand (FR)"

to

--Michelin Recherche Et Technique S.A., Granges-Paccot (CH); Compagnie Gererale des Establissements Michelin, Clermont-Ferrand (FR)--

Signed and Sealed this  
Ninth Day of April, 2013

Teresa Stanek Rea  
*Acting Director of the United States Patent and Trademark Office*